US005710868A

United States Patent [19]
Basehore

[11] Patent Number: 5,710,868
[45] Date of Patent: Jan. 20, 1998

[54] APPARATUS AND METHOD FOR GENERATING A FUZZY NUMBER FOR USE IN FUZZY LOGIC SYSTEMS

[75] Inventor: Paul M. Basehore, Sanford, Fla.

[73] Assignee: Microchip Technology Incorporated, Chandler, Ariz.

[21] Appl. No.: 538,939

[22] Filed: Oct. 4, 1995

Related U.S. Application Data

[63] Continuation-in-part of Ser. No. 408,407, Mar. 23, 1995, which is a continuation-in-part of Ser. No. 41,235, Mar. 31, 1993, Pat. No. 5,412,752, which is a continuation-in-part of Ser. No. 893,093, Jun. 3, 1992, Pat. No. 5,459,816, which is a continuation-in-part of Ser. No. 712,871, Jun. 12, 1991, Pat. No. 5,245,695.

[51] Int. Cl.$^6$ ........................................... G06G 7/00
[52] U.S. Cl. ................................ 395/3; 395/61; 395/900
[58] Field of Search ................................ 395/3, 11, 61, 395/900, 51; 364/148; 235/463

[56] References Cited

U.S. PATENT DOCUMENTS

| | | | |
|---|---|---|---|
| 5,012,430 | 4/1991 | Sakurai | 395/11 |
| 5,073,867 | 12/1991 | Murphy et al. | 395/27 |
| 5,121,466 | 6/1992 | Zhang | 395/3 |
| 5,202,954 | 4/1993 | Miyazawa et al. | 395/3 |
| 5,222,191 | 6/1993 | Enomoto | 395/3 |
| 5,228,111 | 7/1993 | Nagazumi | 395/3 |
| 5,243,687 | 9/1993 | Ando et al. | 395/3 |
| 5,245,695 | 9/1993 | Basehore | 395/3 |
| 5,245,698 | 9/1993 | Matsunaga | 395/61 |
| 5,280,566 | 1/1994 | Nakamura | 395/51 |
| 5,299,283 | 3/1994 | Hamamoto | 395/3 |
| 5,401,949 | 3/1995 | Ziemacki et al. | 235/463 |
| 5,412,752 | 5/1995 | Basehore et al. | 395/3 |
| 5,459,816 | 10/1995 | Basehore et al. | 395/3 |

OTHER PUBLICATIONS

Ruspini, "On the Semantics of Fuzzy Logic", International J. of Approximate Reasoning, vol. 5, Issue 1, Jan. 1991, pp. 45–88.

Mamdani, "Application of Fuzzy Algorithms for Control of Simple Dynamic Plant", Proceedings Institution of Electrical Engineers, London, vol. 121, No. 12, Dec. 1974, pp. 1585–1588.

Lee, "Fuzzy Logic in Control Systems: Fuzzy Logic Controller—Part I", IEEE Transactions on Systems, Man and Cybernetics, vol. 20, No. 2, Mar./Apr. 1990, pp. 404–418.

Devi et al., "Estimation of Fuzzy Memberships from Histograms", Information Sciences, vol. 35, 1985, pp. 43–59.

Braae et al., "Theoretical and Linguistic Aspects of the Fuzzy Logic Controller", Automatica, vol. 15, No. 5, 1979, pp. 553–577.

(List continued on next page.)

*Primary Examiner*—Tariq R. Hafiz
*Attorney, Agent, or Firm*—Lowe, Price, LeBlanc & Becker

[57] ABSTRACT

An arrangement (apparatus and method) using fuzzy logic for fuzzifying a crisp input using a membership function defined by center, width, and type. The input signals are selected and supplied to a fuzzy input processor. The crisp input signal is fuzzified by selected center and width data corresponding to a selected membership function. Each crisp input is fuzzified by determining the distance of the crisp input from the center of the membership function and linearly complementing the result with respect to the width of the membership function, thereby eliminating the necessity for determining the shape of the membership function. The center and width may be fixed or dynamic values. The fuzzified input signals are successively compared in a min-max comparator which determine a minimum rule term for each rule processed. The minimum rule term is compared with a previously stored minimum rule term to determine a maximum among the minimum rule terms. The fuzzy input processor outputs a clock signal whenever a new maximum among the minimal rule terms is determined, and stores the new maximum value. The arrangement also incudes a fuzzy output processor which executes the rule identified by the fuzzy input processor as the optimum rule. A fuzzy memory interface controls the transfer of data for the fuzzy input processor and the fuzzy output processor, thereby optimizing parameter storage. The disclosed arrangement may be integrated as an integrated circuit or a software-controlled computer system.

59 Claims, 18 Drawing Sheets

OTHER PUBLICATIONS

Zadeh, "Fuzzy Sets", Information and Control, vol. 8, 1965, pp. 338–353.

Tang, "Comparing Fuzzy Logic with Classical Controller Designs", IEEE Transactions on Systems, Man, and Cybernetics, vol. 17, No. 6, Nov./Dec. 1987 pp. 1085–1087.

Lee, "Fuzzy Logic in Control Systems: Fuzzy Logic Controller—Part II", IEEE Transactions on Systems, Man and Cybernetics, vol. 20, No. 2, Mar./Apr. 1990, pp. 419–435.

Ralston et al., "Fuzzy Logic Control of Machining", Manufacturing Review, vol. 3, No. 3, Sep. 1990, pp. 147–154.

Lippmann, "An Introduction to Computing with Neural Nets", IEEE ASSP Magazine, Apr. 1987, pp. 4–21.

Zadeh, "Outline of a New Approach to the Analysis of Complex Systems and Decision Processes", vol. 3, No. 1, IEEE Transactions on Systems, Man, and Cybernetics, vol. 3, No. 1, Jan. 1973, pp. 28–44.

Kohoutek, "Practice of Approximate Reasoning", Proceedings of Manufacturing International '90, Atlanta, Ga., Mar. 25–28, 1990, vol. 5: Design, Reliability, and Education of Manufacturability, pp. 63–68.

Schwartz, "Fuzzy Tools for Expert Systems", AI Expert, vol. 6, No. 2, Feb. 1991, pp. 34–41.

Chiu et al., "A Fuzzy Logic Programming Environment for Real–Time Control", International Journal of Approximate Reasoning, 1988, pp. 163–175.

Watanabe et al., "A VLSI Fuzzy Logic Controller with Reconfigurable, Cascadable Architecture", IEEE Journal of Solid State Circuits, vol. 25, No. 2, Apr. 1990, pp. 376–382.

Zadeh, "Fuzzy Logic", Computer, Apr. 1988, pp. 83–93.

Togai et al., "Expert System on a Chip: An Engine for Real–Time Approximate Reasoning", IEEE Expert, Fall 1986, pp. 55–62.

Leung et al., "Fuzzy Concepts in Expert Systems", Computer, Sep. 1988, pp. 43–56.

Mizumoto et al., "Comparison of Fuzzy Reasoning Methods", Fuzzy Sets and Systems, 1982, vol. 8, pp. 253–283.

Dettloff et al., A Fuzzy Logic Controller with Reconfigurable, Cascadable Architecture, IEEE Conf. on Computer Design (1989) pp. 474–478.

Chiu et al., Real–Time Fuzzy Control: From Linguistic Rules to Implementation on a Chip; Methodologies for Intelligent Systems; Proc. of 2nd Inter. Sym. 14–17 Oct. 1987.

H. Tanaka et al., "Linear Regression Analysis with Fuzzy Model", IEEE Trans. Syst., Man, and Cybernetics, vol. SMC–12, No. 6, (Nov./Dec. 1982), 903–907.

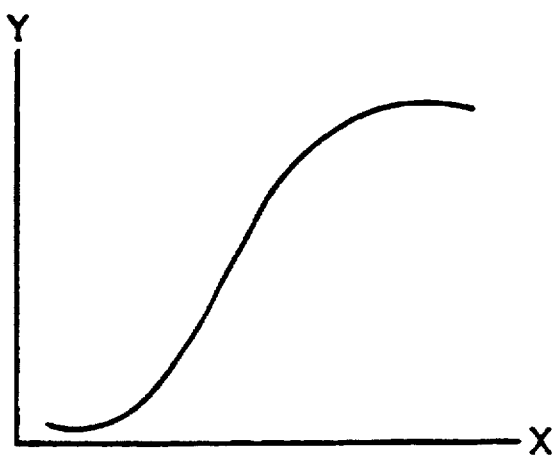
FIG. 1A *(Prior Art)*
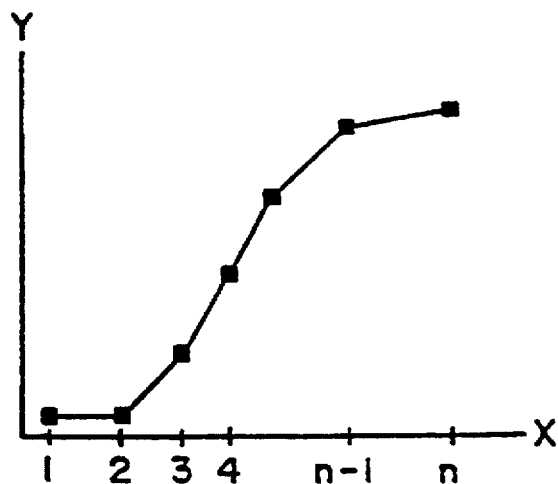
FIG. 1B *(Prior Art)*
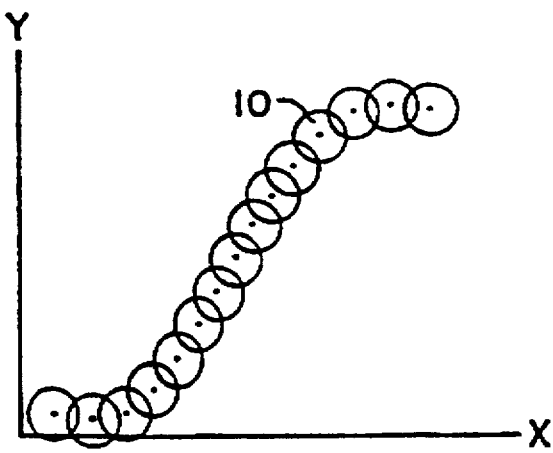
FIG. 1C *(Prior Art)*

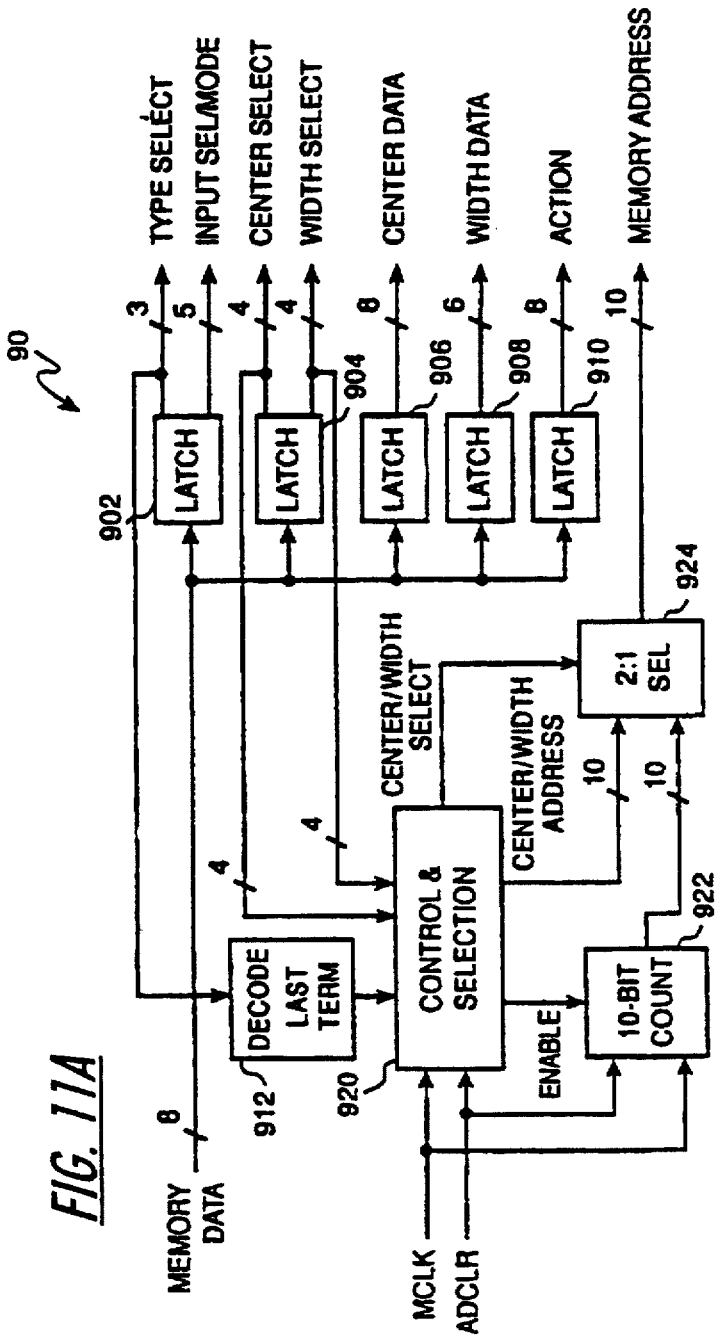

APPARATUS AND METHOD FOR GENERATING A FUZZY NUMBER FOR USE IN FUZZY LOGIC SYSTEMS This application is a continuation-in-part of application Ser. No. 08/408,407, filed Mar. 23, 1995, which is a continuation-in-part of application Ser. No. 08/041,235 (U.S. Pat. No. 5,412,752), filed Mar. 31, 1993, which is a continuation-in-part of application Ser. No. 07/893,093, filed Jun. 3, 1992, U.S. Pat. No. 5,459,816 which is a continuation-in-part of application Ser. No. 07/712,871, filed Jun. 12, 1991, now U.S. Pat. No. 5,245,695.

BACKGROUND OF THE INVENTION

1. Field of the Invention

The present invention relates to an apparatus and method for calculating a fuzzy logic number for use in systems using fuzzy logic.

2. Description of the Related Art

Control systems and computer-controlled electronic devices have historically been controlled by digital control systems. Such control systems use bi-state digital logic which requires a value of either "TRUE" or "FALSE" so that approximations are often required of real-world control problems. For example, an input/output relationship y=f(x) would be specified either as a mathematical function or as a series of points using, for example, a look-up table: the former use of a mathematical function may require complex mathematics to accurately represent real-world control problems; further, the latter use of a look-up table, such as a ROM, introduces problems such as large memory requirements for adequate approximation, the concomitant addressing function associated with large memories, as well as interpolation problems.

For example, FIG. 1A shows an exemplary nonlinear sigmoidal function y=f(x). If digital logic was used to characterize the function y=f(x), it would be necessary to approximate the function shown in FIG. 1A by using discrete values, $Y_i=a_i \cdot x_i$ (i=1, 2, ..., n), as shown in FIG. 1B. Since the number n of "crisp" values is limited, there inherently exists an interpolation error for values of x between $x_i$ and $x_{i+1}$. The term "crisp" refers to an input having a single discrete value. In addition, it becomes impractical to write a rule for every input combination where there exists a large number of inputs whose values can cover a wide input range.

An alternative approach to control theory, known as "fuzzy logic", was developed by L. Zadeh in 1963. Rather than evaluating the two values "TRUE" and "FALSE" as in digital logic, fuzzy terms admit to degrees of membership in multiple sets so that fuzzy rules may have a continuous, rather than stepwise, range of truth of possibility. For example, in applying fuzzy logic, a person need not strictly be included or excluded as a member from a set of "tall persons"; rather, to the extent a person may be "tall" to a greater or lesser degree, the member is assigned to the set with a degree of membership between the values of "1" and "0".

FIG. 1C illustrates the principle of fuzzy logic in evaluating the function illustrated in FIG. 1A. The function f(x) is approximated by a plurality of fuzzy sets 10 which overlap. Rather than approximating a continuous value x by a discrete value $x_i$, fuzzy logic determines for a given value x whether the value x is nearest to the center of a fuzzy set 10. If an x value is equidistant from two or more fuzzy sets, the resultant y value can be made proportional to the output values suggested by all the fuzzy sets of which the value x is a member. Thus, a fuzzy number may be two dimensional, having assigned fuzzy sets and corresponding membership values.

Since fuzzy logic can operate within the relative imprecision of the real-world environment, the advantages of fuzzy logic and fuzzy set theory have become apparent in numerous areas, such as robotics, natural language recognition, the automobile and aircraft industry, artificial intelligence, etc. Exemplary publications describing the theory and applications of fuzzy logic include Devi, B. B. et al., Estimation of Fuzzy Memberships from Histograms, Information Sciences, vol. 35, 1985, pp. 43–59; Braae, M. et al., Theoretical and Linguistic Aspects of the Fuzzy Logic Controller, Automatica, vol. 15, issue 5, 1979, pp. 553–77; Ralston, P. A. S., Fuzzy Logic Control of Machining, Manufacturing Review, vol. 3, no. 3, September 1990, pp. 147–154; Schwartz, Tom J., Fuzzy Tools for Expert Systems, AI Expert, February 1991, pp. 34–41; Kohoutek, H. J., Practice of Approximate Reasoning, Proceedings of Manufacturing International '90 (1990: Atlanta, Ga.) Vol. V: Design, Reliability, and Education of Manufacturability; Lee, Chuen C., Fuzzy Logic in Control Systems: Fuzzy Logic Controller—Parts I & II, IEEE Transactions on Systems, Man and Cybernetics vol. 20, issue 2, March/April 1990, pp. 404–418, 419–435; Mamdani, E. H., Application of Fuzzy Algorithms for Control of Simple Dynamic Plant, Proceedings of the IEEE, vol. 121, issue 12, Dec. 1974, pp. 1585–1588; Tang, K. L. et al., Comparing Fuzzy Logic with Classical Controller Designs, IEEE Transactions on Systems, Man and Cybernetics, vol. 17, issue 6, November/December 1987, pp. 1085–1087; Zadeh, L. A., Fuzzy Sets, Information and Control, vol. 8, 1965, pp. 338–353; Zadeh, L. A., Outline of a New Approach to the Analysis of Complex Systems and Decision Processes, IEEE Transactions on Systems, Man and Cybernetics, vol. 3, issue 1, January 1973, pp. 28–44; and Ruspini, Enrique H., On the Semantics of Fuzzy Logic, International Journal of Approximate Reasoning 1991, vol. 5, pp. 45–86. These publications, which describe in detail the theory of fuzzy logic, are incorporated herein by reference.

The implementation of fuzzy logic for a controller has been suggested by Ralston et al. (1990). As shown in FIG. 2, a "universe of discourse" (e.g., a dimension of continuous values) is defined in step 20 for input and control variables. Membership functions are then defined in step 22 which determine the way observations of the variables are expressed as fuzzy sets. In other words, the fuzzy sets, which are subsets of the universe of discourse, are defined by their respective membership functions. A rule base is then formulated or constructed in step 24 to supply the logic that relates observations applied to the controller input to the required fuzzy control statements; a rule may have the format "IF (Alpha IS SMALL) AND (Beta IS MEDIUM) THEN Gamma IS BIG". A computational unit is then designed in step 26 that uses the rule base to logically obtain control statements from the fuzzy inputs; the computational unit will provide fuzzy outputs in response to the process observations, e.g., the fuzzy inputs. Finally, an action interface is defined in step 28 which will provide rules to translate fuzzy control statements into discrete, crisp values for the input variables applied to the input of the controlled device or process.

The implementation of fuzzy logic in control systems, while promising, has encountered numerous problems. For example, the construction of membership functions may be relatively difficult: the optimum membership function is related to sensor characteristics, control responses, and other dynamic factors. Thus, the determination of the optimum membership function in some cases may only be accomplished empirically. This difficulty in determining the membership function translates into the problem of properly classifying an input into the corresponding fuzzy set.

An additional problem of current fuzzy control systems is the increase in cost due to attempts to increase processing speed.

Highly parallel architectures which are faster than the classic von-Neumann architecture have recently been proposed by Lippman (1987). While these neural net classifiers are faster than the classic von-Neumann machine, the relatively large number of parallel connections in the neural net increases the size of an IC chip, and thus increases the overall cost of the system.

The fuzzy logic systems to date have only been implemented having a relatively small number of inputs. A fuzzy logic microcontroller must have the capacity to handle a large number of inputs, function in accordance with a large number of rules and provide an adequate number of outputs.

Further, more advanced applications of fuzzy logic may require a fuzzy logic microcontroller capable of processing complex membership functions that have varying parameters. For example, a fuzzy logic application may have a fuzzy set having a membership function that varies with respect to time or a given input parameter. Thus, unless the membership function can be defined on the basis of the varying parameter, the definition of the membership function would need to be continually updated during processing, thereby adding substantial complexity to the fuzzifying process. In other words, any adaptive fuzzy logic system would require expert systems to modify the characteristics of the fuzzy logic rules and the topology of the fuzzy sets. Such a system would be costly and complex because of the relatively large memory and processing requirements. Since the proposed system would be trained by prior experiences and not logically trained, an initial training interval would be necessary before the proposed system could be usable. The proposed system would also suffer the risk of following into a local minimum during training, thereby reducing the system's overall efficiency.

DISCLOSURE OF THE INVENTION

There is a need for an arrangement (apparatus and method) for converting a digital number into a fuzzy logic number for use in systems adapted for fuzzy logic.

There is also a need for an arrangement for determining a fuzzy number that is sufficiently flexible to be implemented in any type of digital processing system.

There is also a need for an input processor that calculates a fuzzy logic number using an efficient calculation technique resulting in a minimum use of silicon on an integrated circuit.

These and other needs are met by the present invention, which provides an apparatus and method that converts a digital number into a fuzzy logic number for use in a fuzzy logic-based system. In its simplest form, the arrangement is disclosed as a fuzzifier circuit, also referred to as a fuzzy input processor, within a fuzzy logic processor system, which provides efficient processing without the complexity inherent in digital logic.

The fuzzy logic processor system may be implemented as an integrated circuit, or as software executable in a computer system. The fuzzy logic processor system includes a fuzzy input processor, a fuzzy output processor and a fuzzy memory interface. Each of these elements are designed for maximum flexibility and may be used separately with other digital systems as cores for Application Specific Integrated Circuit (ASIC) designs. Since each of these elements are available as ASIC cores, the customization of fuzzy circuits becomes easier and more affordable.

The fuzzy input processor, also known as a fuzzy processor, directly receives input data and membership function parameter data, namely membership function center, width and type. The input data may be supplied directly or from a multiplexer-based system, and may represent any digital source, such as sensor data, memory data, loop-back data, or any combination thereof. Alternatively, the input data may be digital data for computer processing applications, such as video data from a compressed video data stream, or timing data for a clock recovery system. The fuzzy input processor determines a membership value for each data input. After fuzzification, the fuzzified input signals are processed in accordance with predetermined fuzzy logic rules established in accordance with the designer's specific application parameters in order to determine the optimum rule for execution. Once the optimumrule is identified, the fuzzy logic processor system executes the optimum rule.

The present invention provides a fuzzification method which provides a simple technique for determining the similarity of the crisp input (e.g., the discrete demultiplexed signal undergoing fuzzification) to a fuzzy set. The degree of similarity between the crisp input and the fuzzy set is defined by a membership function $\mu$. The fuzzification method according to the present invention disregards the shape of the membership function $\mu$ and determines the distance of the crisp input from a defined center of the membership function $\mu$. The distance of the crisp input is then linearly complemented with respect to the width of the membership function $\mu$ so that the resulting similarity signal is a maximum when the distance is a minimum, and, conversely, a minimum when the distance is a maximum (e.g., when the crisp input exceeds the width of the membership function $\mu$).

Since the shape of the membership function is disregarded in the similarity determination, the designer of a control system no longer needs to be concerned with the optimum membership function shape or its effects due to sensor characteristics, control responses, or other dynamic factors. As a result, the fuzzification process according to the present invention is simpler to implement while retaining flexibility for variations in control systems.

Another advantage of the present invention is that the membership function parameter data can be directly supplied to the fuzzy input processor, enabling a designer to define a membership function center as a predetermined center or an input source. The assignment of an input source to be a center value causes the corresponding membership function to have a variable, or "floating" center. Since an input may either be an external signal, a feedback signal or an internal timing signal, the use of such floating centers are particularly effective in applications requiring time-variable membership functions, as well as applications comparing two changing inputs to determine a differential or to eliminate a noise component. Similarly, the membership function width data can be supplied from memory as predetermined data or from any of the dynamic sources described above. Thus, the present invention provides the ability to implement dynamic width fuzzifiers for a self-adapting fuzzy logic system that does not require any modification by expert systems.

The fuzzification method of the present invention has been disclosed in various forms in the commonly-assigned U.S. Pat. No. 5,245,695 to Basehore, and commonly-assigned U.S. Pat. No. 5,412,752 to Basehore et al. These patents disclose microcontrollers and ASIC cores that used the fuzzification method to control devices based on received inputs. However, the fuzzification method of the present invention is sufficiently flexible to be implemented in any system using fuzzy logic, including computer-based processing systems, and systems processing digital data streams, such as in telecommunication systems.

Thus, the present invention is directed to the fuzzification method itself, whereby any digital input signal can be fuzzified in accordance with identified membership functions to obtain a fuzzy number for use in a fuzzy logic-based system. Since fuzzy logic has unlimited applications, the fuzzification method of the present invention can be implemented as a front end signal processor for any type of system using fuzzy logic, including, but not limited to, adaptive recognition systems, communication systems that generate or transport digital data, video recording and display systems, etc. Thus, the present invention is able to fuzzify a digital data stream from any source, including disc memory, telephony systems, digital video, etc.

The features of the present invention will become more readily apparent from the below detailed description and the accompanying drawings.

BRIEF DESCRIPTION OF THE DRAWINGS

Reference is made to the attached drawings, wherein elements having the same reference numeral designations represent like elements throughout, and wherein:

FIGS. 1A, 1B and 1C illustrate the logical distinctions between digital logic and fuzzy logic;

FIG. 11A discloses a block diagram of the fuzzy memory interface of FIG. 3;

FIG. 11B discloses an exemplary memory structure for rule terms processed according to the present invention;

BEST MODE FOR CARRYING OUT THE INVENTION

The present invention is directed to the arrangement for generating a fuzzy number from a supplied digital number in accordance with defined membership functions having a constant slope. The disclosed arrangement may be implemented as a front-end signal processing circuit, as disclosed in more detail below with respect to the preferred embodiment, or may be implemented as a software routine in a computer-based processing system that uses fuzzy logic routines.

As disclosed below, the fuzzy input processor receives a crisp input signal, defined as an input signal that yields a single, precise value. The value may be generated from any source, such as a sensor, a data stream from a communication link, a stored data value, or a feedback signal.

A description will now be given of an exemplary implementation of the fuzzifying method of the present invention in a fuzzy logic controller system of the type disclosed in commonly-assigned U.S. Pat. Nos. 5,245,695 and 5,412,752, the disclosures of which are incorporated in their entirety by reference.

Figure 2:
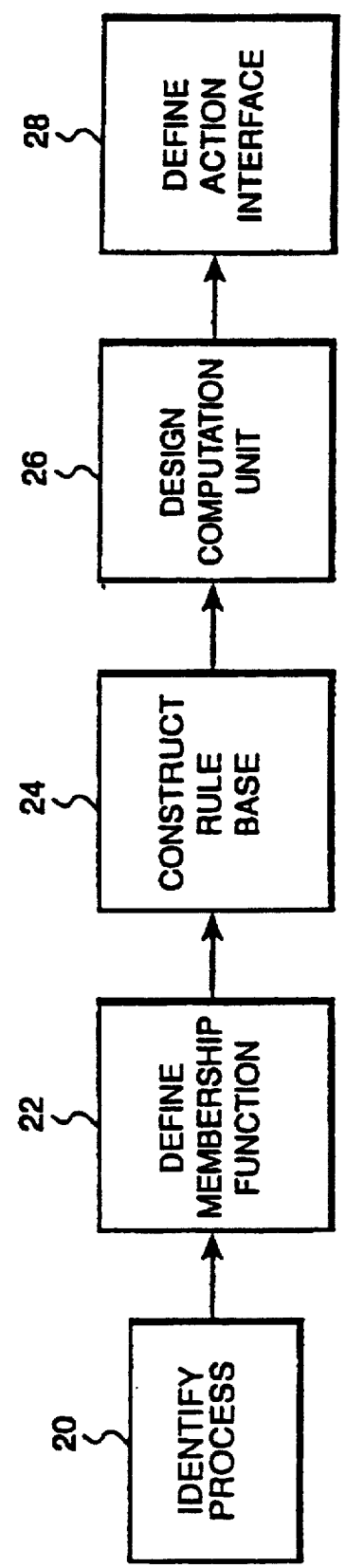
FIG. 2 discloses a conventional method for fuzzy logic in a controller.
Figure 3:
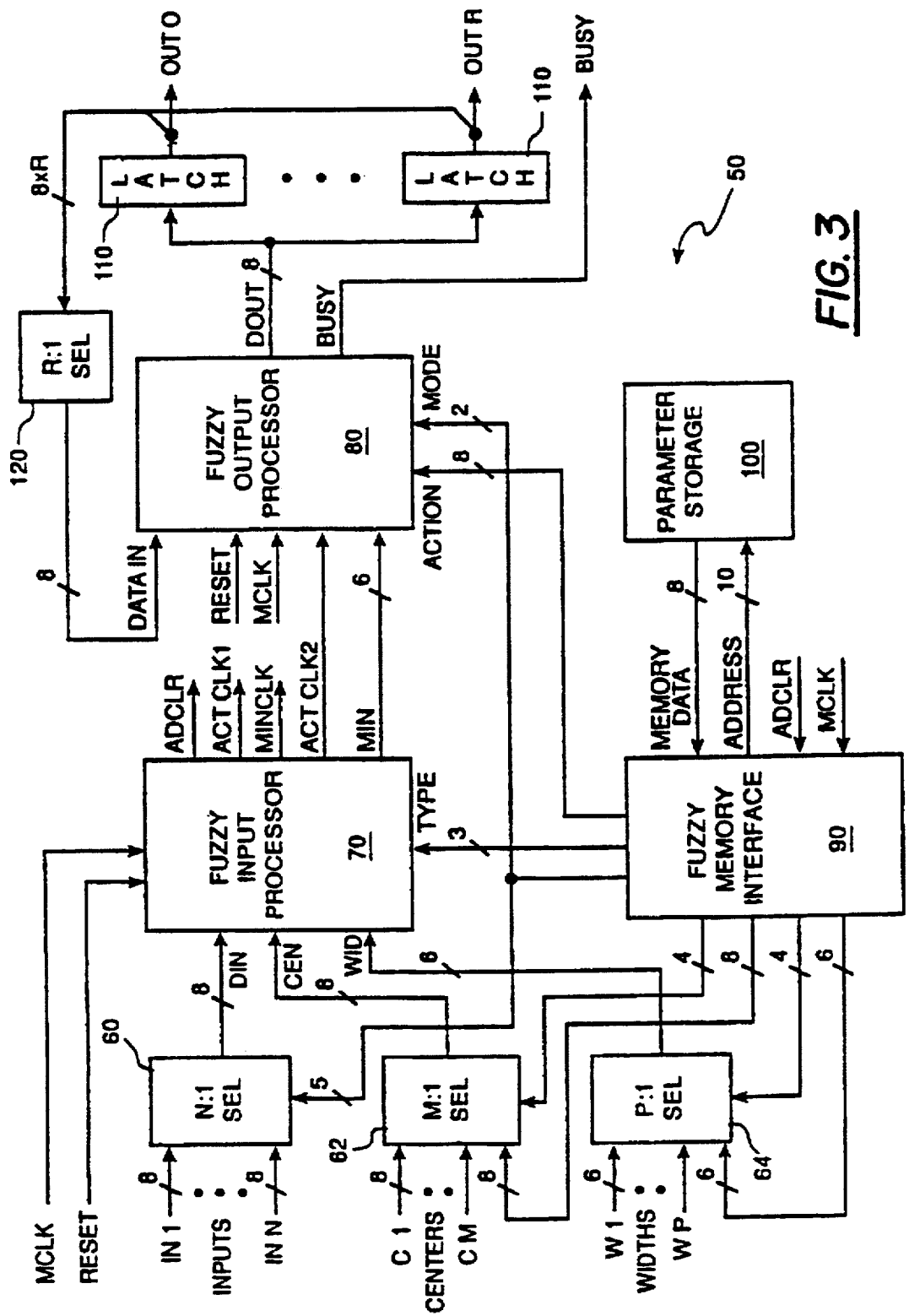
FIG. 3 discloses a block diagram of the fuzzy microcontroller according to a preferred embodiment of the present invention.

FIG. 3 discloses a block diagram of a fuzzy processor system 50. The fuzzy processor system 50 controls a plurality of devices by outputting an output signal DOUT to a corresponding controlled device (not shown). The value of the output signal DOUT is determined by the signals input to the fuzzy processor system 50 and the set of rules defining the action to be taken by the output signal under certain input conditions. The fuzzy processor system 50 of the present invention compares the input signals to each of the terms contained in the rules, one term and one rule at a time, to determine which rule will provide the optimum output.

The fuzzy processor system 50 includes a set of selectors 60, 62 and 64, a fuzzy input processor 70, a fuzzy output processor 80, a fuzzy memory interface 90, a byte-wide memory storage device 100, and a set of output latches 110 and a selector circuit 120. Although not shown, an external counter controls the output latches 110.

The input selector 60 selects one of a plurality of inputs as data to be fuzzified in response to a 5-bit input select signal from the fuzzy memory interface 90. The inputs may be from any external source such as a multiplexer (not shown) which time-multiplexes a plurality of sensor signals, for example. Although the input signal may be either analog or digital, the preferred embodiment uses an eight (8) bit digital word so that the input selector 60 receives a data stream of 8-bit digital input signals from each of the external sources. The input selector 60 can accommodate analog TDM inputs by configuring the input selector 60 for TDM inputs and including an 8-bit A/D converter.

The center selector 62 and the width selector 64 select one of a plurality of inputs for center and width data in response to 4-bit center select and width select signals, respectively supplied by the fuzzy memory interface 90. The center select and width select signals, supplied by the fuzzy memory interface 90, enable a designer to create a variety of membership functions by combining the center and width parameter data from different sources. The inputs to the center selector 62 and the width selector 64 can be any digital inputs, such as a stored value, a digitized sensor signal, or a clock signal. Therefore, the center or width of any membership function can be either a fixed or a dynamic value based upon time, temperature, force, distance, etc. enabling the processing of dynamic membership functions. This feature is particularly effective in control systems having instability problems, and enables a self-adapting fuzzy logic system by defining the center and width of membership function on the basis of dynamic parameters.

The fuzzy memory interface 90 also supplies center and width data to the center selector 62 and the width selector 64, respectively, enabling the fuzzy input processor 70 to receive the fuzzy set parameter data from a variety of sources, including the external memory storage device 100, which may be implemented on the same integrated circuit or on a separate circuit. In computer-related applications, the parameter storage 100 may be implemented as a nonvolatile random access memory, a read only memory, or a magnetic or optical disc.

The fuzzy input processor 70 receives the selected 8-bit input data (DIN), center data (CEN) and 6-bit width data (WID) from the corresponding selector. The fuzzy input processor 70 also receives a 3-bit type command signal (TYPE) from the fuzzy memory interface 90 that indicates the type of membership function being used (described in detail below).

The selected input data signal (DIN) is fuzzified in accordance with the corresponding fuzzy set parameter data, namely center data (CEN), width data (WID) and the type command signal (TYPE).

The fuzzy input processor 70 sequentially processes the supplied data to determine the minimum rule term for each rule of a given output and the relative maximum for all the rules processed for the given output. In other words, a given output has a set of predetermined rules, although a specific rule may be shared across many outputs. Each rule has a set of rule terms that define the rules. As a result, the data inputs corresponding to a single rule are grouped together for successive processing.

The fuzzy input processor 70 successively processes the selected group of fuzzy inputs in accordance the rule being processed. The fuzzy input processor 70 determines whether the fuzzy logic rule has a likelihood of being executed on the basis of the fuzzified input signals. For example, a rule may be of the form "IF (Temp IS HOT) AND (Beta IS VERY HUMID) AND (Motor IS LOW) THEN INCREMENT Motor BY BIG INCREASE". Each of the terms (e.g., "Temp IS HOT") of the rule is compared with the corresponding fuzzy input (e.g., "Temp") to determine whether there is a low or high correlation. The correlations of each of the rule terms are then compared to determine the minimum level of correlation amongst the rule terms. The minimum rule term (e.g., the rule term having the minimum level of correlation) represents the overall likelihood of the rule being executed on the basis of the fuzzified input signals. The fuzzy input processor 70 determines the minimum rule term for each rule sequentially, for example, one rule at a time. As described in detail below with respect to FIGS. 8A and 8B, the minimum rule term can be saved and applied to the subsequent rule being processed, thereby concatenating a plurality of rules to determine the minimum rule term.

The fuzzy input processor 70 outputs the minimum rule term as a 6-bit minimum term signal (MIN) and sets a strobe (MINCLK) that indicates new minimum data that is valid for data access. The fuzzy input processor 70 also compares the minimum rule term of the selected rule with the minimum rule terms of other corresponding rules and identifies the rule which has the maximum value for the minimum rule term. As described in detail below, the fuzzy input processor 70 outputs an action clock (ACT CLK1) when the minimum rule term under comparison (output as the current minimum term signal (MIN)) is greater than the previously stored minimum rule term, e.g., whenever a new winning rule has been determined. The fuzzy input processor 70 outputs a second action clock (ACT CLK2) at the end of the processing cycle of the last rule of a given output. As discussed in detail below, the last rule of a given input is identified by the type command signal (TYPE).

Therefore, the winning rule for a given output can be determined by monitoring the action clock (ACT CLK1), and can be used to latch an action address into an external register. The action clock (ACT CLK2) verifies the last occurrence of the action clock (ACT CLK1) as representing the optimum rule for the given output.

The fuzzy output processor 80 receives the 6-bit minimum rule term signal (MIN) and the second action clock (ACT CLK2) from the fuzzy input processor 70. The fuzzy output processor also receives an 8-bit action value of a processed rule (ACTION) and a 2-bit defuzzifying mode signal (MODE) from the fuzzy memory interface 90. FIG. 3 shows that the fuzzy output processor 80 also receives a selected feedback signal (DATA IN) from a selector 120. As described in detail below, the fuzzy output processor 80 outputs a result (DOUT) for the winning rule to output latches 110 in accordance with one of the following selectable modes: Immediate, Accumulate, and Weighted Average. The mode is selected in accordance with the defuzzifying mode signal (MODE).

Figure 4:
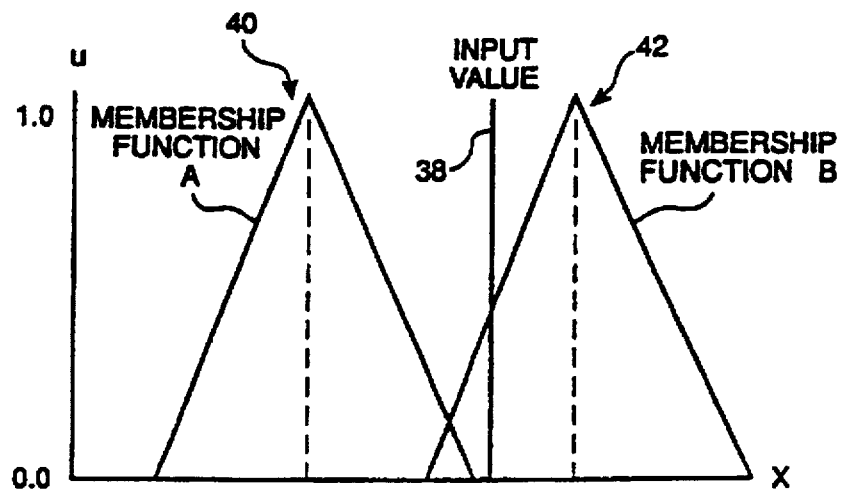
FIG. 4 illustrates a relationship between two fuzzy sets and a crisp input.

The fuzzifying method of the present invention will now be disclosed with reference to FIGS. 4 and 5A-5F. FIG. 4 illustrates a relationship between a crisp input 38 and two arbitrarily selected and exemplary fuzzy sets 40 and 42 having membership functions A and B. The term "crisp" refers to any input or output which yields a single, precise value. Since most digital systems use scalar values, the fuzzy processor system 50 accepts crisp inputs and can provide crisp outputs.

Each membership function specifies a relationship between the crisp input 38 and the corresponding fuzzy set. In other words, the membership functions determine the size of the fuzzy sets 10 shown in FIG. 1C. The evaluation of the conjunction of the crisp input 38 with a membership function results in a "fuzzy term" representing the degree of membership or non-membership of the crisp input 38 in the corresponding fuzzy set. Since it is a fuzzy number the fuzzy term may be used in subsequent fuzzy rules, similar to Boolean operations.

Figure 5A:
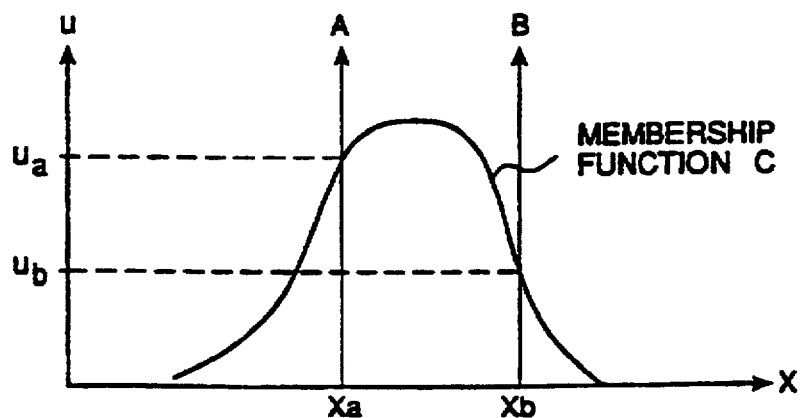
FIGS. 5A–5F illustrate exemplary relationships between a fuzzy set and a range of inputs on the basis of the membership function of the fuzzy set according to the fuzzifying method of the present invention.

Thus, the membership function in a fuzzy system defines the degree of similarity between an unknown input and a known value or class (for example, the fuzzy set). As shown in FIG. 5A, the degree of membership $\mu_a$ for a crisp input A having a value $X_a$ occurs at the point where the crisp input A intersects the membership function C. However, due to nonlinearities in the control system (for example, sensor characteristics, control responses, dynamic responses) the membership function $\mu$ may be nonlinear relative to the input dimension X, making the determination of the membership function shape, and hence the similarity determination, difficult to implement.

Figure 5B:
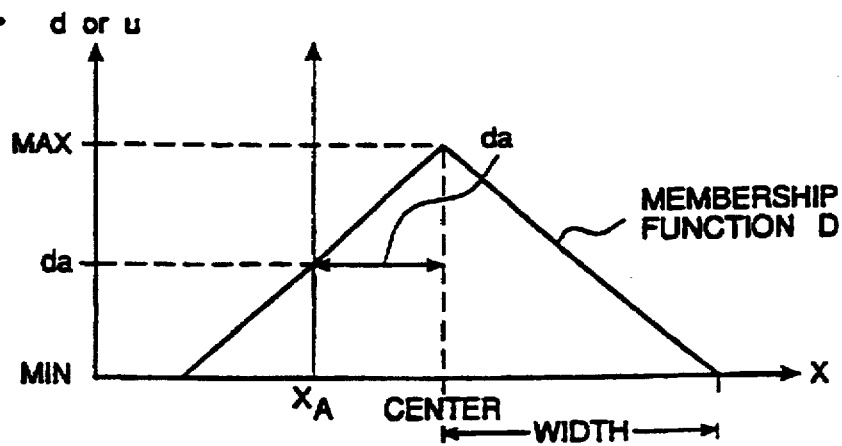

In order to avoid the determination of the membership function shape, the fuzzifying method of the present invention predefines the slope of the membership function, and determines the distance between the crisp input and the membership function center. As shown in FIG. 5B, the membership function D is defined to be linear with a predetermined slope (for example, the slope is one-to-one). Rather than determining the intersection point of the membership function and the crisp input $X_A$, the fuzzifying method measures the distance da by subtracting the crisp input from the known center value and ignoring the sign. The difference is then complemented with respect to the width of the membership function D so that if the input and the center are the same, then the similarity value da is a maximum, whereas if the input is further from the center, the similarity value approaches a minimum.

Figure 5C:
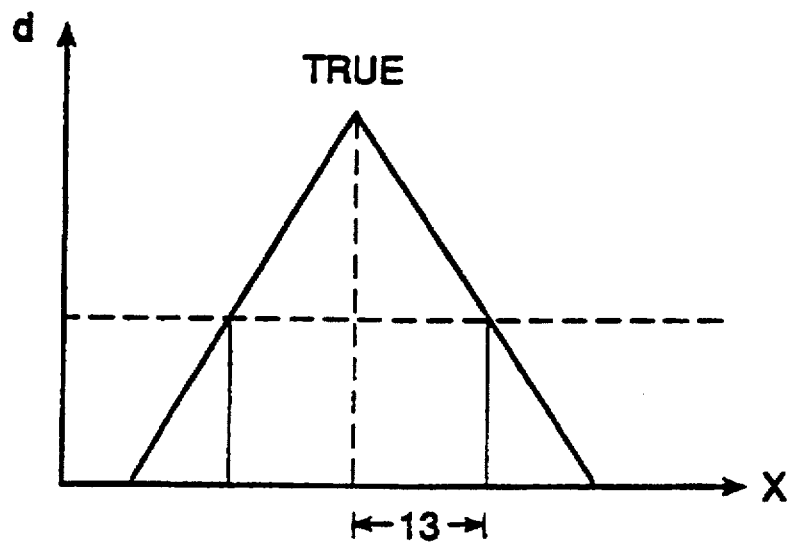
Figure 5D:
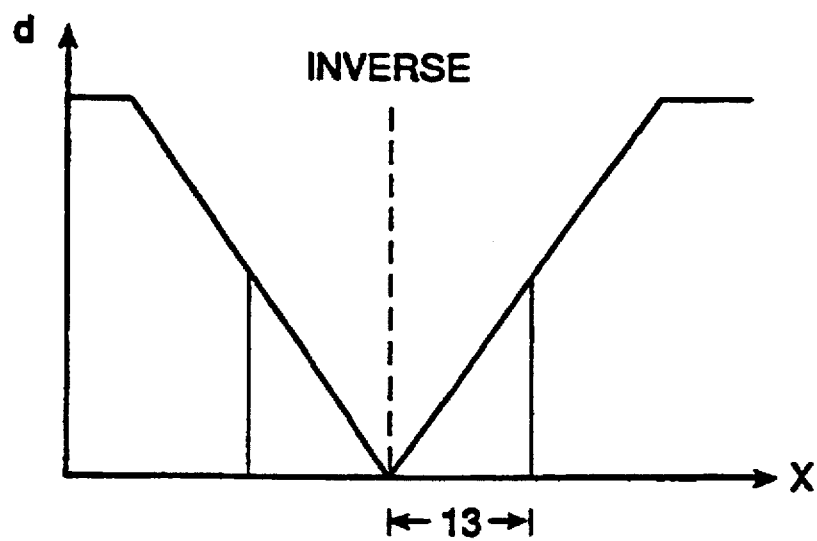

FIGS. 5C and 5D show a step membership function having true (inclusive) and inverse (exclusive) polarity, respectively. The dashed lines extending from the membership function illustrate the shape of the membership function if the width was set at a maximum. In other words, although the width of the membership functions in FIGS. 5C and 5D are set at a value of "13", the maximum width according to the preferred embodiment is "63". Therefore, if a crisp input X was outside the membership function of FIG. 5C, the similarity value would be forced to the minimum or zero.

Figure 5F:
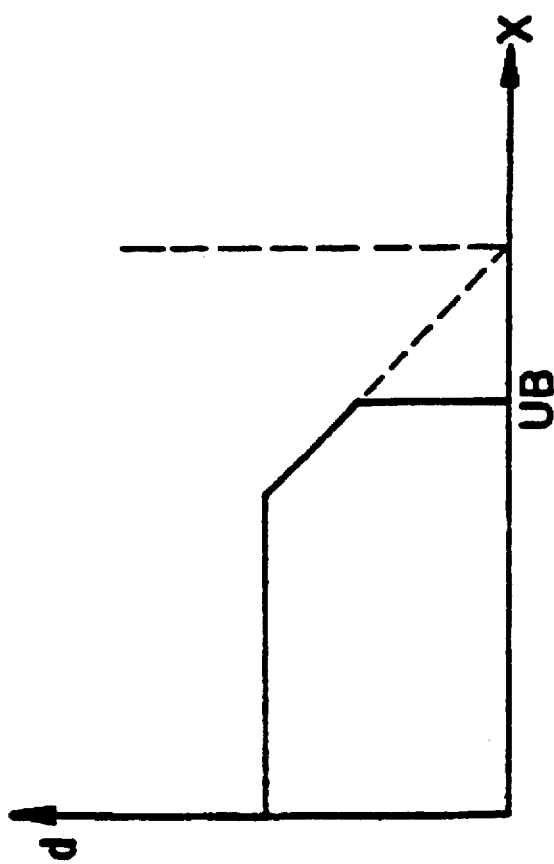
Figure 5E:
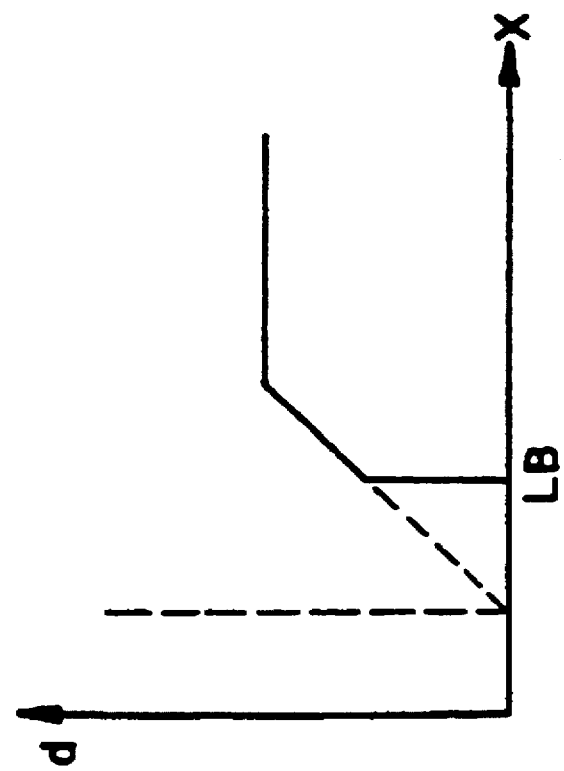

FIGS. 5E and 5F show membership functions for Greater Than and Less Than membership functions, respectively, each having inclusive polarity. In order for a crisp input to be a member of the Greater Than membership function, the distance between the crisp input and the center value must be greater than or equal to the lower boundary LB of the preset width value; conversely, in order for a crisp input to be a member of the Less Than membership function shown in FIG. 5F, the distance between the crisp input and the center value must be less than or equal to the upper boundary UB of the preset width value. It will be recognized using conventional Boolean operations as applied to fuzzy logic that a Greater Than membership function having inverse (exclusive) polarity will be equal to a Less Than membership function having a true (inclusive) polarity.

The advantages of the fuzzifying method of the present invention are that a designer of a control system is not required to determine a membership function shape for all fuzzy sets, and also that the fuzzifying method can be easily implemented in hardware. Specifically, implementation of membership functions that do not have a constant slope would require multiple multipliers and dividers, which require additional processing time in software and extra silicon space in hardware. The present invention uses only adders and subtractors in the fuzzy calculation, resulting in a more efficient execution, either in hardware or software. Further, the Less Than and Greater Than membership functions are asymmetrical membership functions. Consequently, utilization of both asymmetrical membership functions, via rule selection, provides the ability to define an adjustable height membership function. A preferred embodiment of the fuzzifying method is disclosed with reference to FIGS. 7A and 7B (see below).

Figure 6:
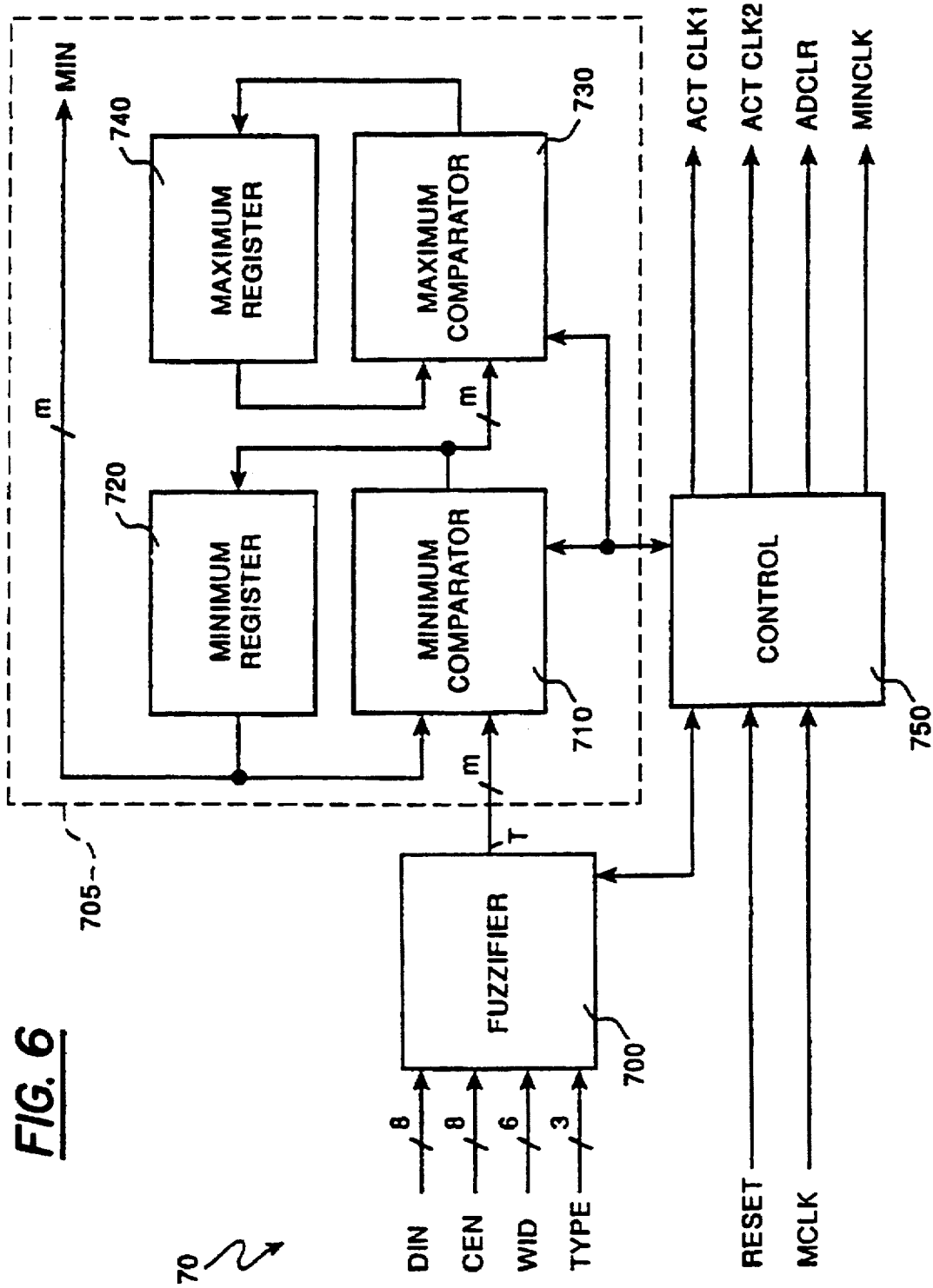
FIG. 6 discloses a block diagram of the fuzzy input processor of FIG. 3.

FIG. 6 shows a functional block diagram of the fuzzy input processor 70 of FIG. 3. The fuzzy input processor 70 includes a fuzzifier 700, a Min/Max circuit 705 and a control circuit 750. The Min/Max circuit 705 includes a minimum comparator 710, a minimum register 720, a maximum comparator 730 and a maximum register 740.

The fuzzifier 700 fuzzifies the 8-bit input data (DIN) in accordance with the supplied fuzzy set parameter data, namely the 8-bit center data (CEN), the 6-bit width data and the 3-bit type command signal (TYPE). The data is latched on the rising edge of the clock (MCLK). The type command signal (TYPE) identifies which of the membership functions of FIGS. 6C–6F are being processed. Alternately, the type command signal (TYPE) indicates the completion of processing of the rule terms for a given rule, or the completion of the last rule for a given output. Table 1 summarizes the 3-bit definitions for the type command signal (TYPE):

TABLE 1

| TYPE | DEFINITION |
| --- | --- |
| 000 | Last Rule Processed |
| 001 | Last Term in the Current Rule |
| 010 | Symmetrical Inclusive |
| 011 | Symmetrical Exclusive |
| 100 | Right Inclusive |
| 101 | Right Exclusive |
| 110 | Left Inclusive |
| 111 | Left Exclusive |

Thus, the fuzzifier 700 outputs the fuzzified input as a rule term (T) to the minimum comparator 710 in accordance with the type of membership function selected.

The control circuit 750 outputs the strobe signals ACT CLK1, ACT CLK2, ADCLR and MINCLK in accordance with the operations of the fuzzifier 700 and the Max/Min comparator 705. The address clear (ADCLR) signal is used to set any external rule memory address counter and is set following the action clock (ACT CLK2) or whenever the RESET signal is received.

Figure 7A:
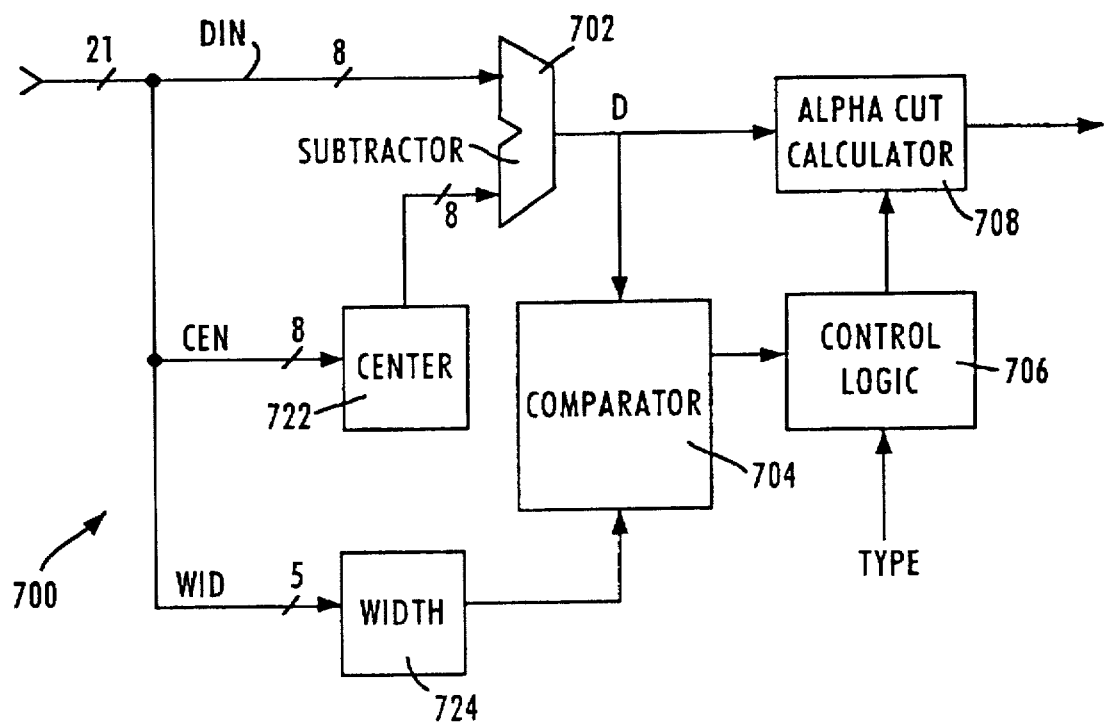
FIGS. 7A, 7B, 7C and 7D are diagrams illustrating implementations of the fuzzifier of FIG. 6.
Figure 7B:
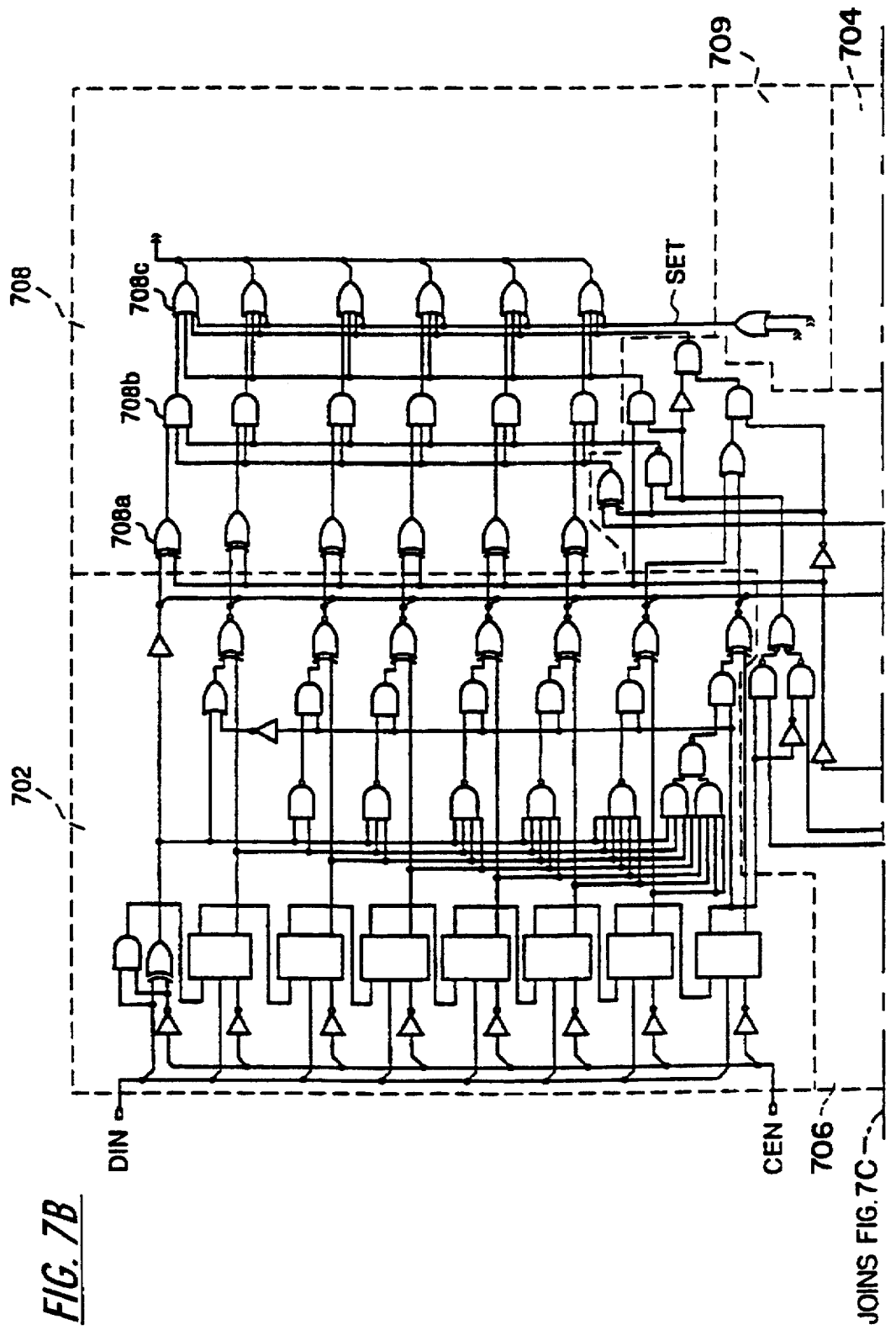
Figure 7C:
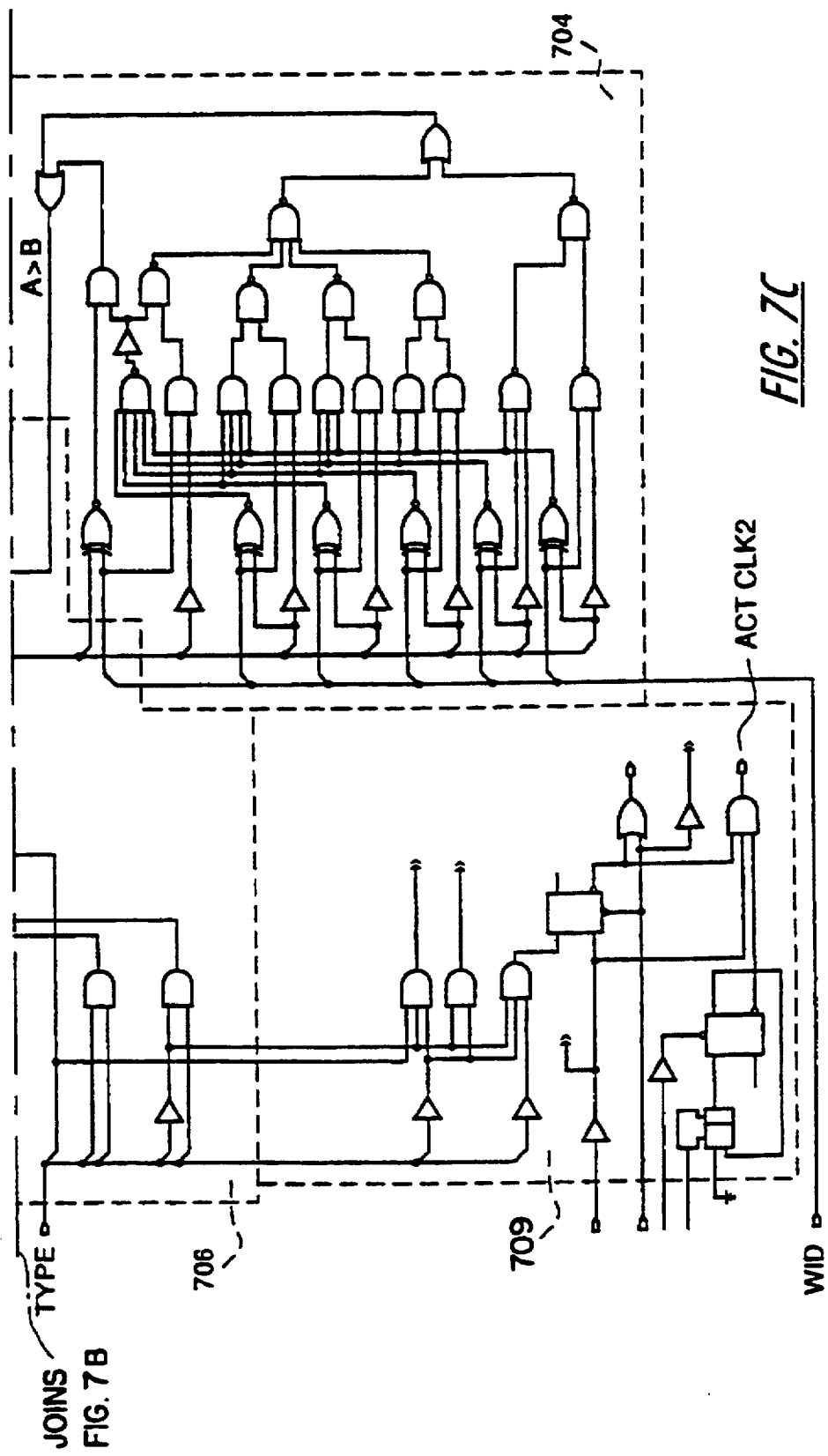
Figure 7D:
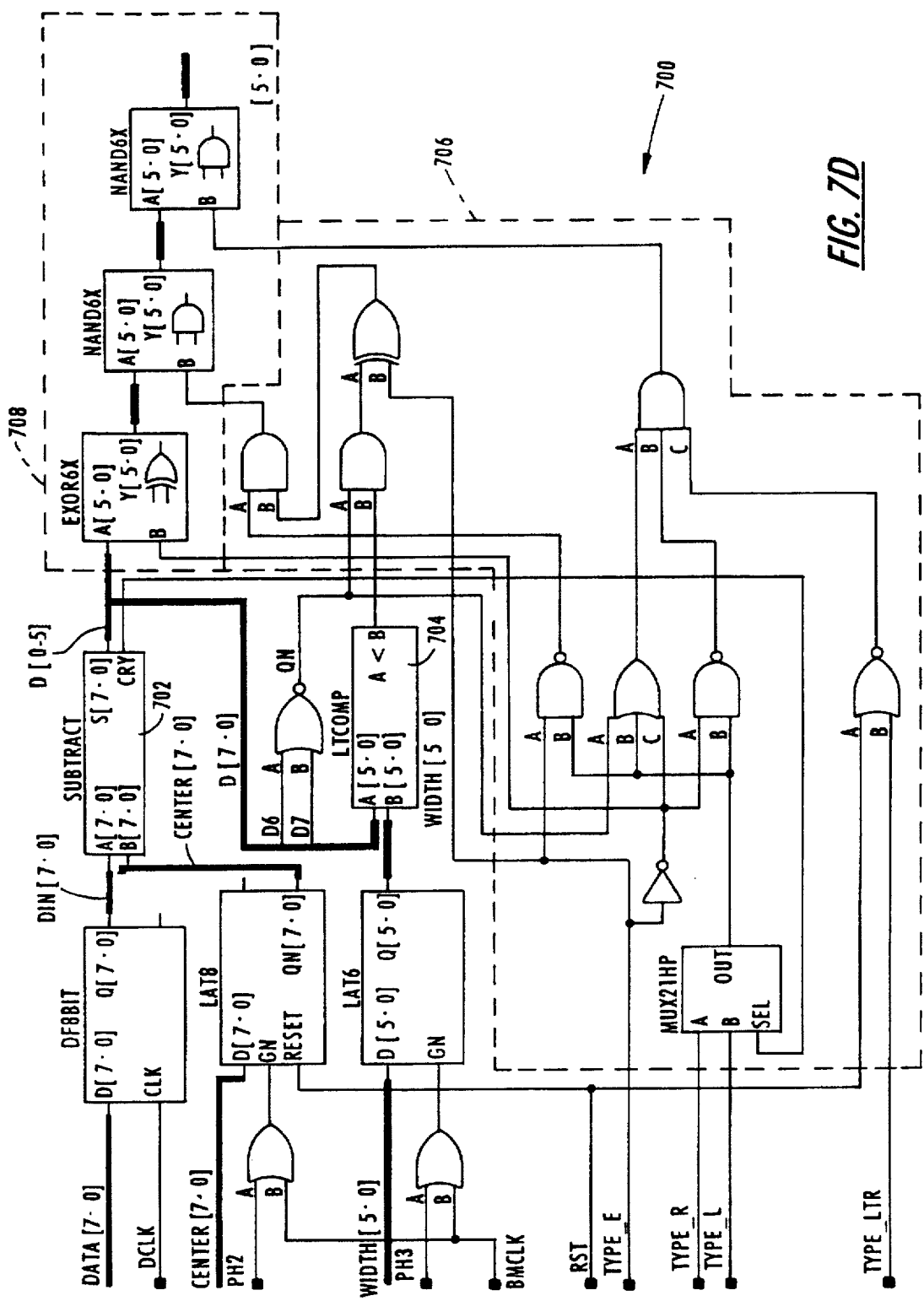

FIG. 7A is a simplified block diagram of the fuzzifier 700 of FIG. 6, and FIGS. 7B and 7C summarize an exemplary schematic diagram of the fuzzifier 700. An alternative implementation is also shown in FIG. 7D. The fuzzifier 700 determines the similarity of a crisp input to a selected fuzzy set using the fuzzifying method disclosed with reference to FIGS. 5C–5F. The 8-bit input data (DIN) and center data (CEN) are supplied to a subtractor circuit 702. The subtractor circuit 702 outputs a difference signal (D) representing the distance between the crisp input and the center value. The difference signal (D) from the subtractor 702 is input to a width comparator 704 and compared with the membership function width value (WID). The width comparator 704 compares the difference signal (D) with the width value (WID) and outputs a comparison signal (A>B) to a control logic circuit 706. As shown in FIGS. 7A and 7D, the center and width values may be stored in latches 722 and 724, respectively.

The control logic circuit 706 determines whether the fuzzified value should be forced to a maximum value or a minimum value in accordance with the type command signal (TYPE), the comparison signal (A>B), and an overflow bit from the subtractor circuit 702. Thus, the control logic circuit 706 receives an overflow bit from the subtractor 702 to determine whether the distance exceeds the maximum possible width of the membership function. According to the preferred embodiment, the maximum width is sixty-three (decimal); thus, the overflow bit output from the subtractor 702 indicates whether the distance from the center to the crisp input exceeds the maximum width.

The control logic circuit 706 outputs control signals to an alpha cut calculator 708 in response to the result of the comparison from the comparator 704, and the configuration signals identifying the membership mode. The alpha cut calculator 708 outputs the fuzzified data from the difference of the subtractor 702 using the following logic: if the crisp data is outside the membership function (e.g., the result of comparison indicates the difference value is greater than the width of the membership function), then the fuzzified value is forced to zero if the polarity bit is not set (e.g., membership function is inclusive or "TRUE"); however, if the polarity bit is set, then the fuzzified value is forced to zero if the crisp data is "inside" the membership function.

In accordance with the fuzzifying method of the present invention, since the membership function has a one-to-one linear slope, the alpha cut calculator 708 takes the complement of the difference value and outputs the result as a similarity value, representing the degree of membership to the fuzzy set. The complement is determined as follows. According to the exemplary membership function presented in FIG. 5C, the maximum width of the membership function is "63" decimal, so that if a crisp input had, for example, a value "CI=7", and a selected membership function had a center location "CL=13" decimal and a width "W=9", then the difference "DIFF=13-7=6" would be complemented to result in a similarity value "COMP(DIFF)=ABS(6-63)=57" decimal. Thus, the similarity value is "57", with the maximum value being "63" if the difference DIFF was zero. As a result, the fuzzifying method of the present invention provides a simple and effective method for similarity determination between a crisp input and a fuzzy set.

The alpha cut calculator 708 includes an invertor circuit 708a, an AND circuit 708b, and an OR circuit 708c, each of which receive the control signals from the control logic circuit 706. The invertor circuit 708a performs a 1's complement inversion of the lowest six bits of the difference signal output from the subtractor 702 in accordance with the inclusive/exclusive bit from the type command signal (TYPE). The AND circuit 708b clears all the bits of the difference value when a "0" is received from the control logic circuit 706, and the OR circuit 708c sets all the bits of the difference value when a "1" is received from the control logic circuit 706.

The alpha cut calculator 708 also sets the term value (T) in response to a type decoder 709. The type decoder 709 outputs a set signal (SET) to the OR gate 708c whenever the type command signal indicates a last term (LT), a last rule (LR), or whenever the system reset signal (RESET) is activated.

FIG. 7D is a simplified block diagram of variation of the fuzzifier 700, whereby a flip flop 720 and latches 722 and 724 temporarily store input data, center data, and width data, respectively.

Figure 8A:
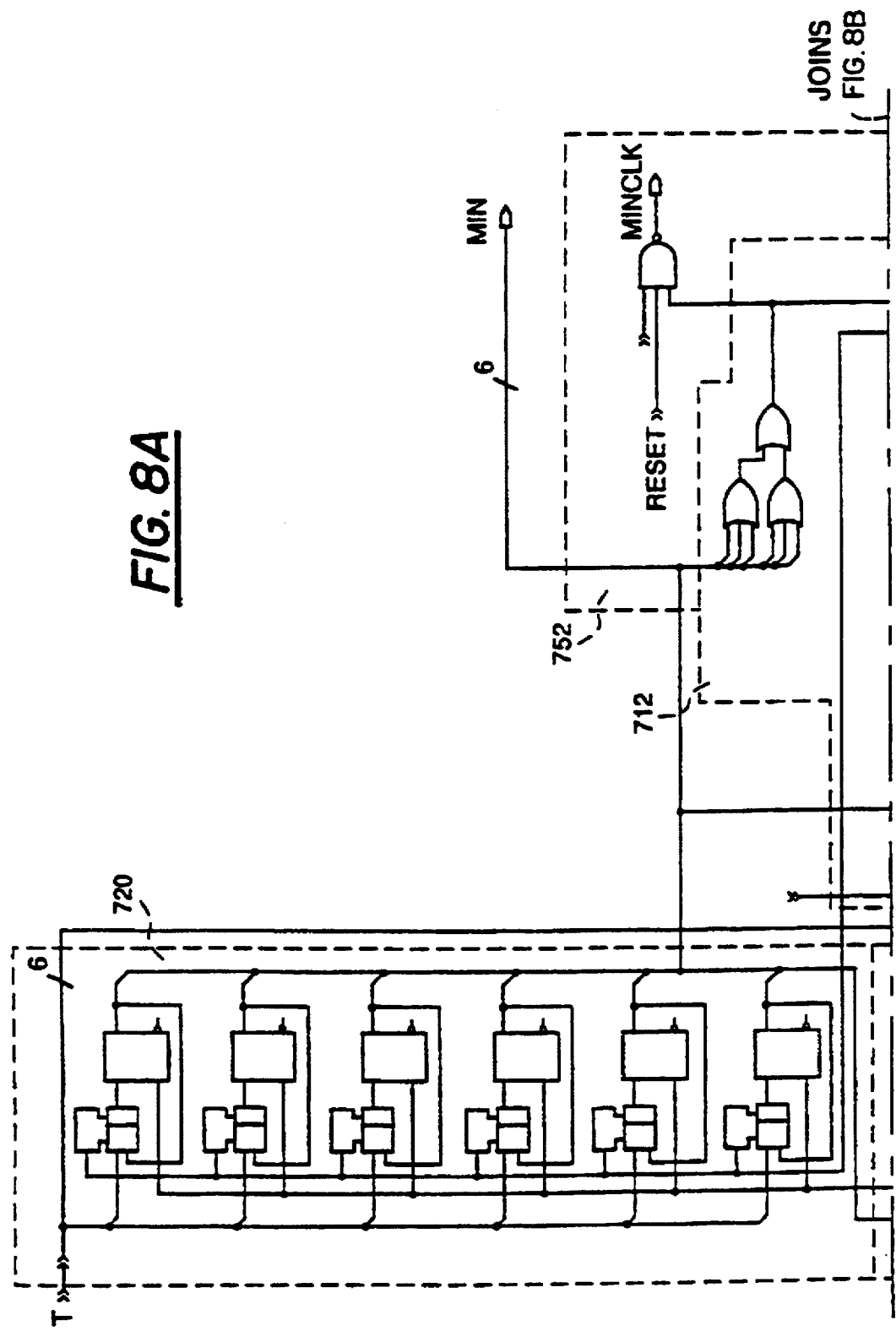
FIGS. 8A and 8B discloses the Max/Min comparator of FIG. 6.
Figure 8B:
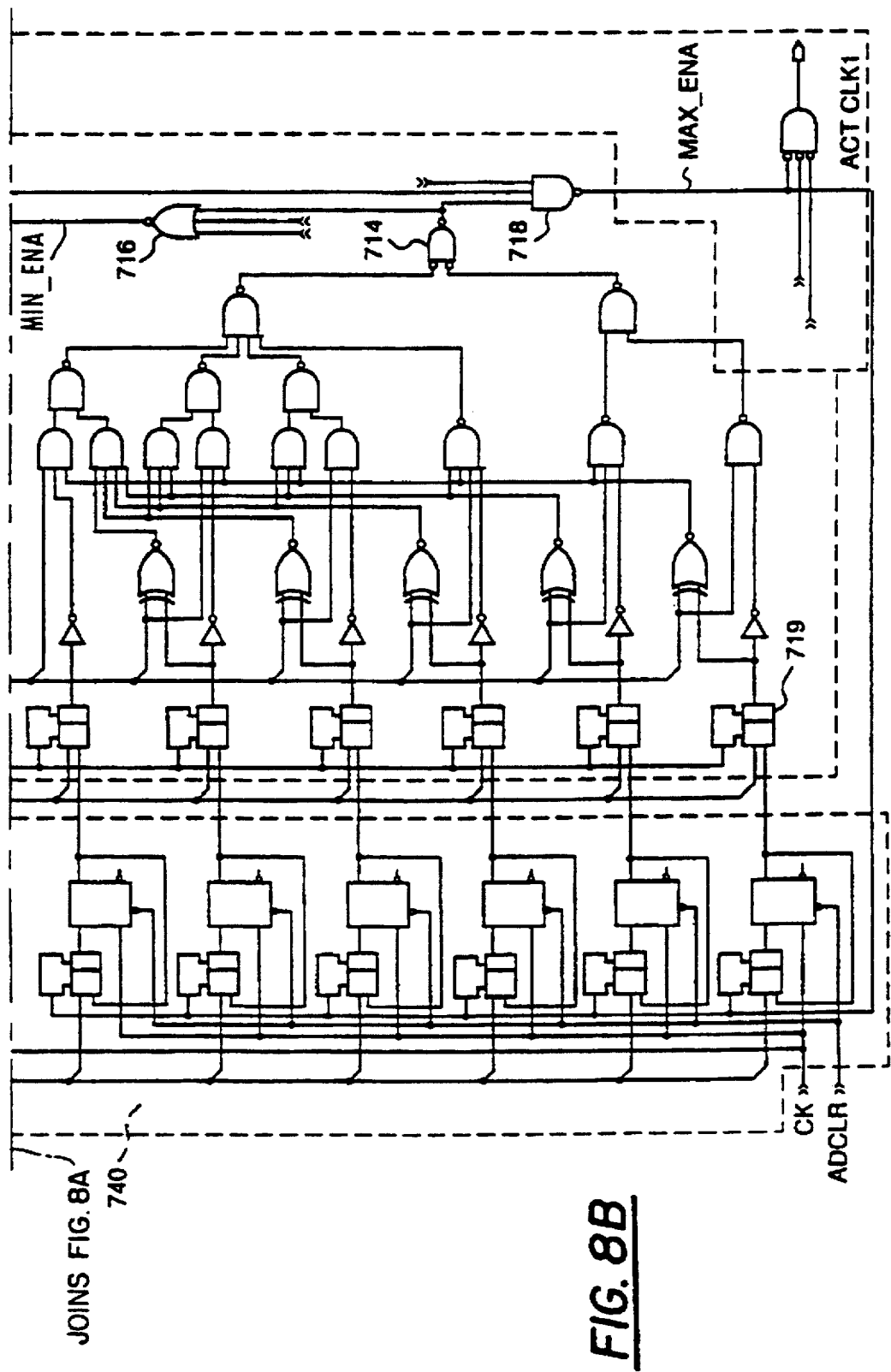

FIGS. 8A and 8B disclose the Min/Max comparator 705 and a portion of the control circuit 750 of FIG. 6. Although FIG. 6 functionally shows the minimum comparator 710 and the maximum comparator 730 as separate elements for illustration purposes, the two comparator functions are performed by the same Min/Max comparator circuit 712 in order to minimize silicon area on an IC. Similarly, one of ordinary skill in the art will realize that the type decoder 709 and the control circuit portion 752 in combination make up the control circuit 750.

The fuzzified input term (T) from the fuzzifier 700 and the stored minimum value (MIN) from the minimum register 720 are supplied to the Min/Max comparator 712. The Min/Max comparator circuit 712 compares the fuzzified input term (T) and the stored minimum value (MIN) and outputs a result of comparison. Specifically, the NAND gate 714 outputs a result of comparison to the NOR gate 716 and the NAND gate 718. The NOR gate 716 and the NAND gate 718 output appropriate latch signals to the minimum register 720 and the maximum register 740, in accordance with the LT.LR control signal from the type command signal decoder 709. Thus, the NOR gate 716 outputs a minimum enable signal (MIN_ENA) when the type command signal indicates the last term or last rule is not yet being processed, when the reset signal is not set, or when the NAND gate 714 indicates that the term value (T) is less than the stored minimum value (MIN) (active low).

Conversely, the NAND gate 718 outputs a maximum enable signal (MAX_ENA) (active low) to the maximum register 740 when the NAND gate 714 outputs a signal indicating that the stored minimum value (MIN) is greater than the stored maximum value, and when the type command signal (TYPE) indicates the last rule is being processed.

The Min/Max comparator 712 includes a series of selectors 719 that select either the fuzzified input term (T) or the stored maximum value from the maximum register 740 in response to the LT.LR control signal from the type decoder 710. Thus, the type command signal (TYPE) controls whether the Min/Max comparator 712 operates in a minimum or maximum mode.

The control circuit portion 752 outputs the strobe MIN-CLK in response to the LT.LR control signal from the type decoder 710 shown in FIGS. 7A and 7B The control circuit portion 752 also outputs the clock signal (ACT CLK1) in response to the maximum enable signal (MAX_ENA) from the NAND gate 718. As will be readily apparent to those of ordinary skill in the art, the strobe MINCLK becomes active on every last term or last rule providing that the result of all terms of that rule is greater than 0. The MINCLK signal is used by the fuzzy output processor in order to provide a weighted output average output (discussed in detail below).

The action clock (ACT CLK1) is generated on every last term or last rule provided that the minimum data is greater than or equal to the stored maximum data. Finally, the action clock (ACT CLK2) is generated on every last rule provided that the rule contained at least one action clock signal (ACT CLK1).

Thus, the action signal (ACT CLK1) can be used to identify the latest winning rule in order to restore the relevant action values related to that winning rule. Further, the action clock (ACT CLK2) can be used by external logic to latch the action data accessed during the occurrence of the action clock (ACT CLK1).

Finally, the address clear (ADCLR) is generated every last rule, and is utilized to clear the maximum register 740. The address clear (ADCLR) may also be used to clear external memories.

Figure 9:
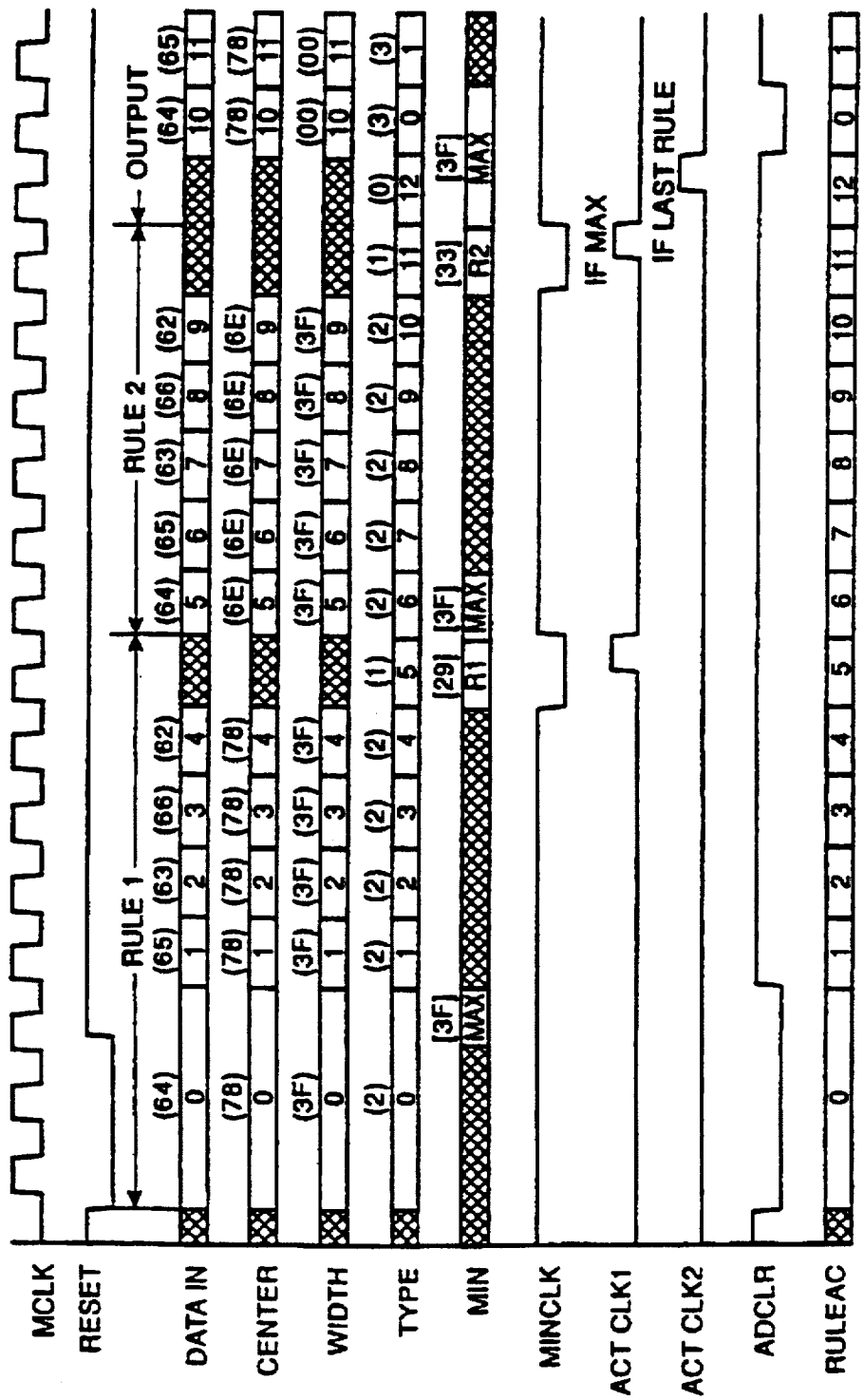
FIG. 9 discloses a timing diagram of the fuzzy input processor of FIG. 6.

FIG. 9 is a timing diagram of the fuzzy input processor 70 shown in FIG. 6. FIG. 9 assumes that there is an external rule address counter for processing each rule of an output. As shown in FIG. 9, when the reset signal (RESET) is active (active low), the address clear (ADCLR) signal becomes active, clearing the rule address counter. The selected data is supplied to the fuzzy input processor 70 when the address clear (ADCLR) signal goes high. Data is clocked in during the rising edge of the master clock (MCLK). Exemplary data values are shown in parentheses as hexadecimal values. During each clock cycle, the fuzzified data is successively compared to the previous data to determine the minimum rule term, namely the crisp input having the farthest distance away from a membership function center. As shown in FIG. 9, the fourth data input (DATA IN) during processing of Rule 1 has a value of 62 hex. When compared with the center value of 78 hex, the hexadecimal difference is 16. When complementing the unsigned difference to six bits, the result is 29 hex.

The minimum value, 29 hex, is compared at the maximum comparator 730 and stored in the maximum register 740 if the value is larger than the previously stored value. Updating the maximum register causes an action clock (ACT CLK1) to be generated. The minimum clock (MINCLK) occurs when the type command signal (TYPE) has a value of 1, indicating the last rule term has been processed. This process continues for all the rules until the last rule command is issued, when the type command signal (TYPE) has a value of 0. At that time, the fuzzy input processor 70 outputs the action clock (ACT CLK2) and the address clear (ADCLR), which starts a new cycle.

Figure 10:
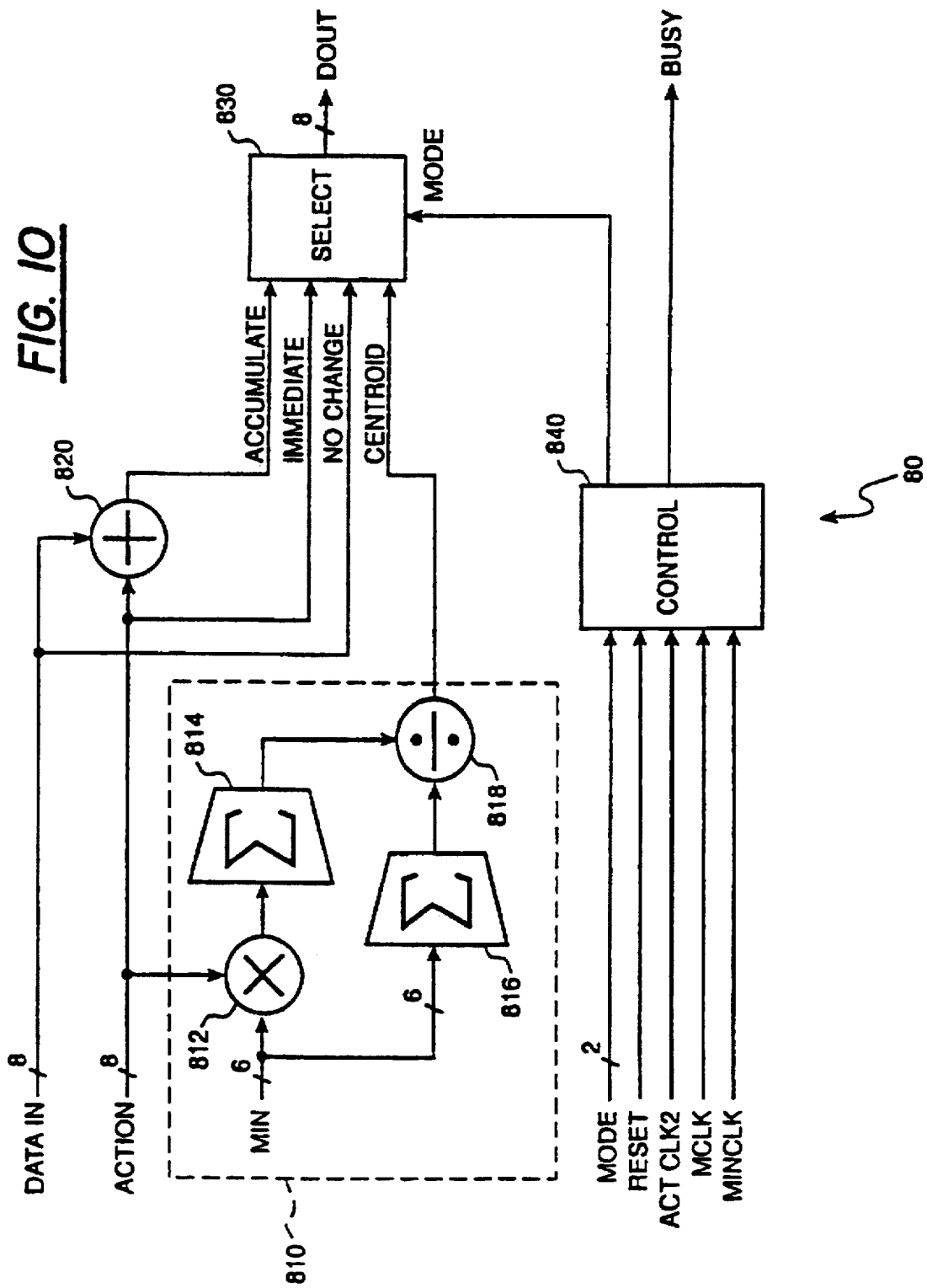
FIG. 10 discloses a block diagram of the fuzzy output processor of FIG. 3.

FIG. 10 discloses a block diagram of the fuzzy output processor 80 of FIG. 3. The fuzzy output processor 80 includes a centroid calculator 810, also referred to as a rule mode processor, which calculates a centroid value, also known as a weighted average. The fuzzy output processor 80 also includes an adder 820 providing an accumulate mode by adding the action value corresponding to a winning rule to the previous output, which is supplied to the fuzzy output processor 80 via the DATA IN signal line (see FIG. 3). The signal paths DATA IN and the ACTION signal lines are also directly supplied to a select circuit 830, which selects one of the output modes as the output action value (DOUT) in accordance with a mode signal from a control circuit 840. The mode signal, supplied from the fuzzy memory interface 90 shown in FIG. 3, identifies the output mode for the corresponding winning rule.

The centroid calculator 810 includes a multiplier 812 which receives the 6-bit value signal (MIN) from the fuzzy input processor 70. The multiplier 812 also receives the 8-bit action value and supplies the multiplied result to a summation circuit 814. The minimum value signal (MIN) is also supplied to a summation circuit 816. The summation circuits 814 and 816 output their respective summation results to a dividing circuit 818, which provides the weighted average value, or centroid value, to the select circuit 830.

The Weighted Average mode causes the fuzzy output processor 80 to provide an averaged value of all the actions associated with the winning rules from the Min/Max comparator to be applied to the output action value (DOUT). Thus, the weighted average mode modifies the output by the average of the actions of all rules where a membership was considered valid. Specifically, the weighted average mode implemented by the centroid calculation circuit 810 follows the equation:

$$W = \frac{\sum_{i=1}^{n} m_i * a_i}{\sum_{i=1, m_i \neq 0}^{n} m_i}$$

where W is the average action value or centroid value output to the select circuit 830, n is the number of rules used by an output, $m_i$ is the minimum of terms value (MIN) for rule i, and $a_i$ is the action value (ACTION) assigned to the rule i. The rule mode processor 810 multiplies the minimum of terms value MIN with the corresponding action value ACTION and accumulates the weighted average W until the last rule for a corresponding output is processed, and divides by the accumulated minimum of terms value MIN.

Alternatively, normalization can be performed by dividing the accumulated value $m_i*a_i$ by the number of rules n multiplied by the value "63", which is the height of the membership function. The normalization can also be performed by dividing the accumulated value by "64" by performing a bit shift of the numerator, with negligible error.

The number of rules n used by an output and the identity of a last rule for each output is determined by the action clock (ACT CLK2), whereby the control circuit 840 outputs the mode signal (MODE) to the selector circuit 830 as described in the above incorporated U.S. Pat. No. 5,412,752.

FIG. 11A discloses a block diagram of the fuzzy memory interface 90 of FIG. 3. The fuzzy memory interface 90 receives an 8-bit memory data signal (MEMORY DATA), the master clock signal (MCLK), and the address clear signal (ADCLR) from the fuzzy input processor 70. The memory data signal (MEMORY DATA) represents the configuration data from an external byte wide memory for a rule to be processed. Thus, the memory data signal (MEMORY DATA) is a combination of term, rule and action data.

The byte-wide memory 100, shown in FIG. 3, is organized in three sections. These sections are defined as rule/term storage, center storage, and width storage. The memory organization is illustrated in Table 2.

TABLE 2

| DECIMAL ADDRESS | HEX ADDRESS | FUNCTION |
| --- | --- | --- |
| 0 to 991 | 000 to 3DF | Rules |
| 992 to 1007 | 3E0 to 3EF | Centers |
| 1008 to 1023 | 3F0 to 3FF | Widths |

As described previously, rules are organized as groups of one or more terms. FIG. 11B shows that each term is made up of two bytes. The first byte always is stored at an even address, and selects the input and type for the respective term. When the type is the last term, the input select field is used for selecting the defuzzification mode as well. The second byte, stored at an odd address, contains the center and width select fields that point to the address having the desired center and width data, respectively. When the last type is the last term, this byte then contains the action data value, or alternately could contain the address which points to the desired action data.

Therefore, the number of bytes required for any rule is Bytes per rule=((2×)# of terms)+2.

The last 32 bytes of the addressed external memory are used to store the 16 widths and centers. When used, this data is output on the center and width data buses, and the 4-bit addresses for these parameters are output on the center and width select buses.

Thus, the appropriate address data is loaded into the fuzzy memory interface 90 via the memory data signal line (MEMORY DATA). The latch 902 obtains the input select or mode data from the first byte of the rule memory portion of the parameter storage 100, and the 3-bit type select data from the first byte and supplies it to a decoder 912. The latch 904 receives the center select and width select data from the second byte of the rule memory. The latches 906 and 908 receive center data and width data, respectively, addressed from the external memory. As shown in FIG. 3, the center data and width data are supplied to selectors 62 and 64, respectively. The latch 910 receives the action data value from the second byte of the rule and outputs the action value to the fuzzy output processor 80.

Address generation for the external memory 100 is performed by the control and selection circuit 920, the 10-bit counter 922, and the 2:1 selector 924.

Operation of the fuzzy memory interface 90 will now be described with reference to FIG. 11A. The initialization is controlled by the address clear signal (ADCLR), whereby all transitions occur after the rising edge of the master clock (MCLK). The first clock causes the type command (TYPE) and input select data (INPUT SEL) to be read from the memory and latched by latch 902. The next clock latches the center and width select data to the latch 904. This address is used by the control selection circuit 920 to retrieve the actual center and width data during the next two clocks, which are thereafter stored in latches 906 and 908, respectively. The fourth clock cycle then repeats until a last term is decoded. This detection causes the action data to be latched in latch 910, and passed on to the fuzzy output processor 80. The first two addresses for the external memory originate from the 10-bit address counter 922 during the first two clocks. The address counter 922 is then disabled from counting for the next two clocks. The addresses during these clocks are created by the control and selection circuit 920 and the center select and width select information is stored in latch 904. When the address clear (ADCLR) signal is asserted, the control and selection circuit 920 resets the counters, and the entire cycle begins again from address 0.

If inputs or outputs are not to be used as centers or widths, the selectors 62 and 64 shown in FIG. 3 can be eliminated. In such a case, the 8-bit center and 6-bit width data from the fuzzy memory interface 90 would be connected to the fuzzy input processor.

One of ordinary skill in the art would realize that the fuzzy memory interface 90 provides flexibility in the memory configuration of rule terms. However, the fuzzy memory interface could be replaced by other logic controlling the addressing of rule terms to the fuzzy input processor 70 and the fuzzy output processor 80.

The fuzzy microcontroller of the present invention provides efficient control using fuzzy logic, with high processing rates using minimum silicon space. The fuzzy microcontroller also provides an efficient method for compressing input and output data by time division multiplexing. Further, the fuzzy microcontroller provides a fuzzifying arrangement (apparatus and method) which is easy to implement by avoiding the necessity of determining a shape of a membership function. The availability of a floating fuzzifier, whereby a center is defined on the basis of a second input, enables more complex membership functions to be easily implemented. Further, the use of an adjustable width membership function enables a simple implementation of an adaptive fuzzy logic system.

Figure 12A:
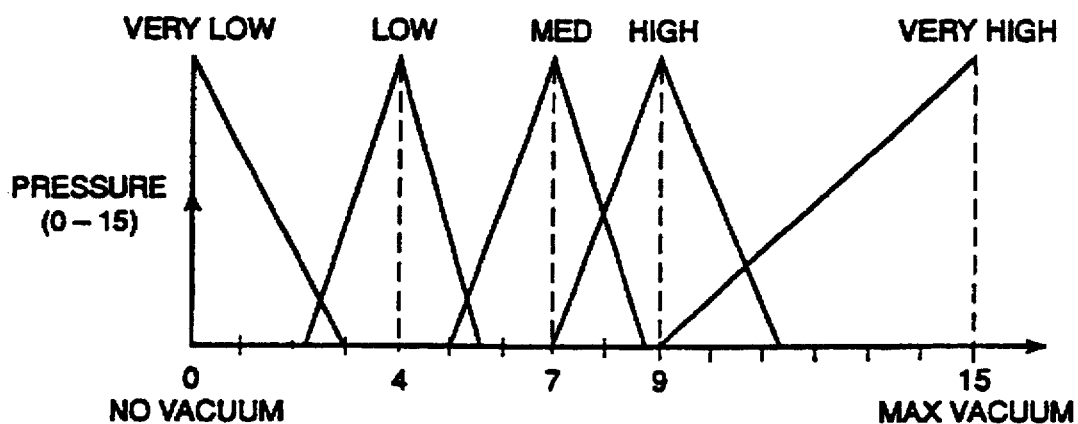
FIGS. 12A, 12B and 12C illustrate exemplary membership functions for an application of the fuzzy microcontroller of the present invention.
Figure 12B:
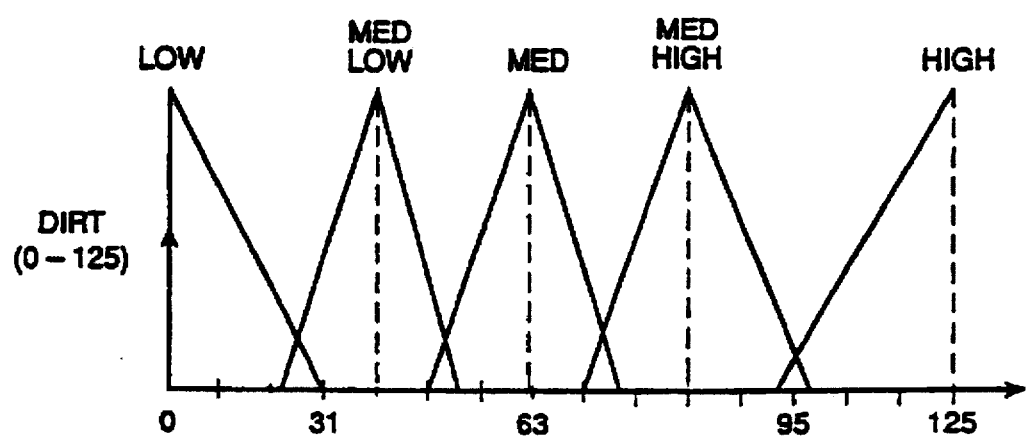
Figure 12C:
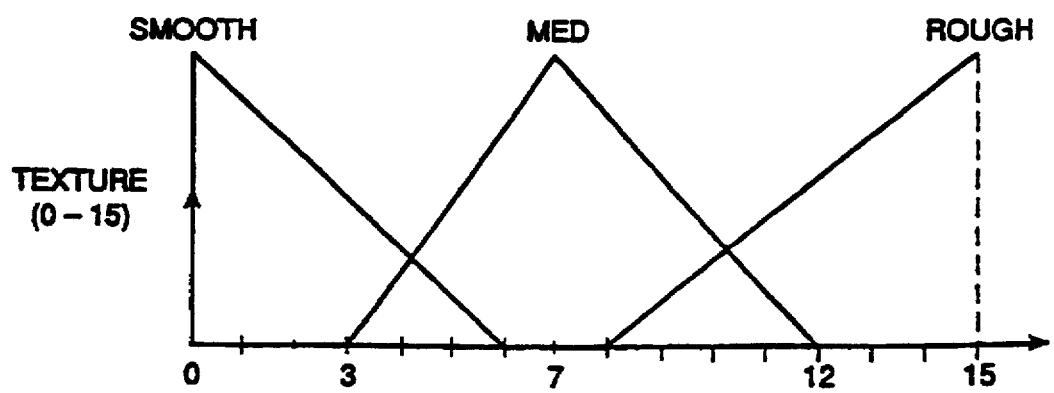

The operation of the fuzzy microcontroller of the present invention will become more apparent with reference to FIGS. 12A, 12B and 12C, which illustrate an application of the fuzzy microcontroller in controlling a vacuum cleaner. Specifically, FIGS. 12A, 12B and 12C each show an input to the fuzzy microcontroller along the X axis (e.g., pressure, dirt and texture), along with a plurality of fuzzifiers for classifying the input data.

As shown in FIG. 12A, the vacuum pressure input may be in one or more of five fuzzy sets: very low, low, medium, high or very high. Similarly, the inputs for dirt and texture (as measured by corresponding sensors) have their respective fuzzy sets as shown in FIGS. 12B and 12C, respectively.

Assuming the vacuum cleaner has three outputs to be controlled, namely VACUUM CONTROL, BEATER HEIGHT and BEATER SPEED, each output will have a number of associated rules to be applied, depending on the inputs pressure (P), dirt (D) and texture (T). Exemplary rules for the VACUUM CONTROL, BEATER HEIGHT and the BEATER SPEED are shown in Tables 3, 4 and 5, respectively.

TABLE 3

VACUUM CLEANER EXAMPLE
VACUUM CONTROL RULES

1. If (D is High) and (T is Rough) and (P is Low) then (Big Increment)
2. If (D is MHigh) and (T is Rough) and (P is Low) then (Increment)
3. If (D is Mlow) and (T is Smooth) and (P is High) then (Decrement)

TABLE 3-continued

VACUUM CLEANER EXAMPLE
VACUUM CONTROL RULES

4. If (D is Low) and (T is Smooth) and (P is High) then (Big Decrement)
5. If (D is Low) and (P is High) then (Big Decrement)

TABLE 4

BEATER HEIGHT RULES

1. If (T is Smooth) and (D is High) then (Big Raise)
2. If (T is Smooth) and (D is MHigh) then (Raise)
3. If (T is Med) and (D is MHigh) then (Raise)
4. If (T is Med) and (D is MLow) then (Lower)
5. If (T is Smooth) and (D is Low) then (Big Lower)
6. If (T is Rough) and (D is MHigh) then (Raise)
7. If (T is Rough) and (D is High) then (Big Raise)
8. If (T is Smooth) and (D is MLow) then (Lower)

TABLE 5

BEATER SPEED RULES

1. If (T is Smooth) and (D is Low) then (Big Decrement Speed)
2. If (T is Med) and (D is Low) then (Decrement Speed)
3. If (T is Med) and (D is MHigh) then (Increment Speed)
4. If (T is Med) and (D is High) then (Big Increment Speed)
5. If (T is Rough) and (D is MHigh) then (Big Increment Speed)
6. If (T is Rough) and (D is High) then (Big Increment Speed)

The fuzzy microcontroller inputs the crisp inputs for pressure dirt and texture, and thereafter fuzzifies the data in accordance with the membership functions shown in FIGS. 12A–12C. The fuzzy microcontroller then determines the minimum rule term for each rule, and then determines the maximum minimum rule for each output. For example, assuming the input values for pressure, dirt and texture were "8", "40" and "5", respectively, the minimum comparator and maximum comparator would provide the following results as shown in Table 6 for the VACUUM CONTROL output.

TABLE 6

| Rule | Rule Term | Center − Input = Diff | Width | M | Min | Max of Min |
|---|---|---|---|---|---|---|
| 1. | D is High | 125 − 40 = 35 | 31 | 0 | | |
| | T is Rough | 15 − 5 = 10 | 7 | 0 | | |
| | P is Low | 4 − 8 = 4 | 2 | 0 | 0 | 0 |
| 2. | D is MHigh | 82 − 40 = 42 | 15 | 0 | | |
| | T is Rough | 15 − 5 = 10 | 7 | 0 | | |
| | P is Low | 4 − 8 = 4 | 2 | 0 | 0 | |
| 3. | D is MLow | 40 − 40 = 0 | 15 | 31 | 0 | |
| | T is Smooth | 0 − 5 = 5 | 6 | 26 | | |
| | P is High | 9 − 8 = 1 | 2 | 30 | 26 | 26 |
| 4. | D is Low | 0 − 40 = 40 | 31 | 0 | | |
| | T is Smooth | 0 − 5 = 5 | 6 | 26 | | |
| | P is High | 9 − 8 = 1 | 2 | 30 | 0 | 26 |
| 5. | D is Low | 0 − 40 = 40 | 31 | 0 | | |
| | P is High | 9 − 8 = 8 | 2 | 30 | 0 | 26 |

As shown in Table 6 with respect to Rule 1, the inputs dirt, texture and pressure are not within the respective membership function widths for HIGH, ROUGH and LOW, respectively; as a result, the corresponding membership value μ (designated M in Table 8) for these fuzzy sets is forced to zero. However, the inputs do fall within the membership function widths for MLOW, SMOOTH and HIGH as shown for Rule 3 in Table 8. Since the minimum rule term for Rule 3 is "26", and since it is the relative maximum of minimum, Rule 3 is selected as the optimal output for the output.

Of course, the membership function definitions may be modified to provide a floating center and a variable width to provide a controller able to adapt to varying conditions.

According to the present invention, the method of fuzzifying a crisp input may be easily implemented in an IC chip by determining the distance between the crisp input and the center of the respective membership function; if the distance is less than the width of the membership function, then the distance value is complemented to determine the alpha cut, or the membership value of the crisp input with respect to that fuzzy set. Since the shape of the membership function for the fuzzy set need not be determined, the fuzzifying method of the present invention can be easily implemented, which results in substantial cost savings in design development and circuit implementation. Moreover, the disclosed arrangement can be used as a digital-to-fuzzy converter in any system using fuzzy logic.

Figure 13A:
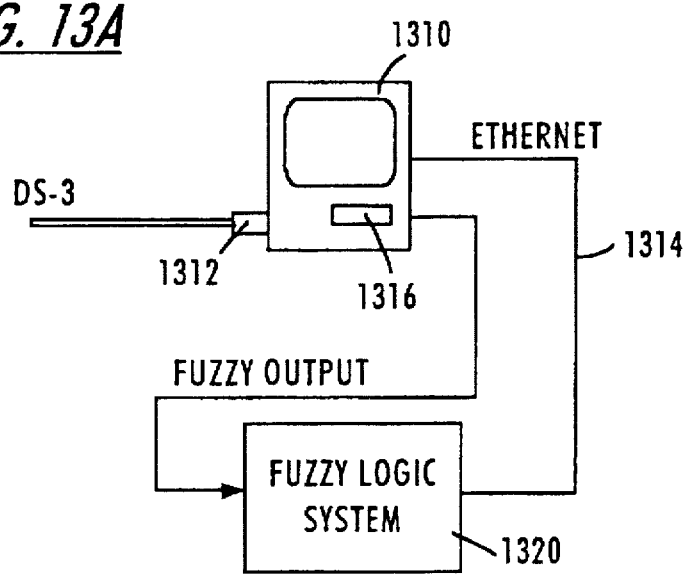
FIGS. 13A and 13B are diagrams showing a software-based computer implementation of the fuzzifying method.
Figure 13B:
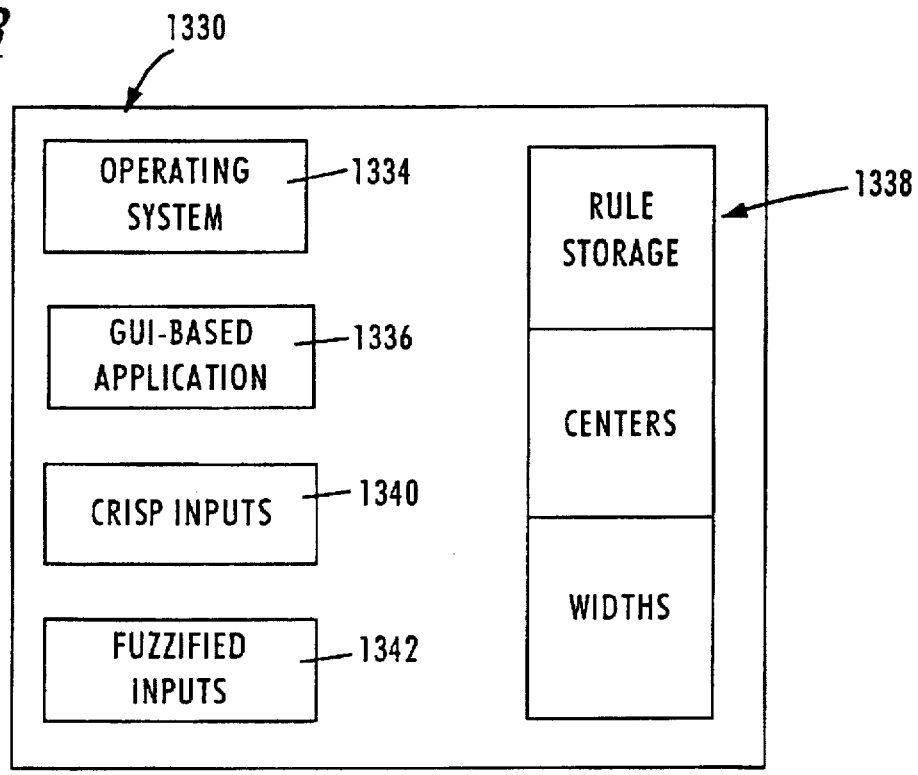

FIG. 13A and 13B are respective hardware and software diagrams showing a computer-based software implementation of the fuzzifying method of the present invention. The software implementation is especially useful for engineering development and modeling, and may be used as a simulation system to fully develop application-specific fuzzy logic rules before implementation in silicon. The software implementation is also useful for large-scale computer systems using fuzzy logic to monitor streams of digital data, for example telecommunications systems monitoring jitter in digitally-multiplexed packet transport networks.

FIG. 13A shows a computer system 1300 comprising a host computer 1310 and a fuzzy logic-based computer system 1320. The host computer 1310 comprises an input interface 1312 for receiving crisp inputs from an external source, such as a digital data stream having a data rate of 44 MB/s (DS-3). The host computer 1310 fuzzifies the incoming data stream in accordance with established rules and outputs the fuzzified values corresponding to the parameters of the data stream being measured (i.e., data values, timing values, address values, etc.) to the fuzzy logic system 1320 for further processing. The fuzzy set parameter data (center, width, type) can be supplied to the host computer from the fuzzy logic-based computer system via an Ethernet connection 1314, or may be loaded into the host computer via a disc drive 1316 that receives a diskette storing software as shown in FIG. 13B. The fuzzy logic-based computer system 1320 performs all related computer functions on the fuzzified values received from the host computer 1310. Thus, the host computer 1310 acts as a fuzzy interface to convert the crisp inputs before fuzzy processing.

Although the hardware shown in FIG. 13A is designed for a large scale processing system, the host computer 1310 may also be used in a stand-alone mode for simulation and design purposes.

FIG. 13B discloses an exemplary software structure of a tangible medium 1330 for controlling operations in the host computer 1310. The tangible medium 1330 may be a silicon-based SRAM rule memory of the type shown in the above-incorporated U.S. Pat. No. 5,245,695, a floppy diskette, or an optical disk. The tangible medium 1330 includes an operating system portion 1332 and a graphic user interface (GUI) based application 1334, such as a design application, a simulation application, or a real-time network monitoring system, for controlling operations of the host computer 1310. An exemplary GUI application 1334 is the INSIGHT Development System developed by Adaptive Logic, Inc., San Jose, Calif. During execution the GUI application 1334 responds to user inputs to process inputs and access the tangible medium in accordance with the system platform established by the operating system 1334.

During execution of the GUI application 1334, the host computer 1310 accesses the parameter storage portion 1338 of the tangible medium 1330 to establish the membership functions used to fuzzify the crisp inputs. The parameter storage portion 1338 corresponds to the memory 100 of FIG. 3 and has the same storage structure as shown in Table 2. The GUI application 1334 may perform fuzzy processing by performing a conversion of a data file 1340 storing a group of crisp inputs, or by processing a crisp input supplied by a user via a keyboard. The processing of the data file 1340 results in generation of a new data file 1342 storing the fuzzified inputs generated in accordance with the membership functions established using the stored parameters from the parameter storage portion 1338.

According to the present invention, the fuzzifying method can be implemented as an integrated circuit or a software-based control system to convert crisp input signals to fuzzy values for subsequent processing in fuzzy logic based systems. Thus, the present invention acts as an interface between crisp inputs and fuzzy processing systems, thereby enabling efficient conversion independent of the fuzzy processing itself.

In addition, the fuzzy input processors of the present invention can be implemented in a cascaded arrangement, in order to provide greater processing capacity for a larger number of inputs, outputs, or both. Those skilled in the art will realize the technique of controlling a plurality of the fuzzy input processors in such a cascaded arrangement.

Those skilled in the art of fuzzy logic will also appreciate that the programmable rule base for an output can include, but not be limited to have any number of rules, any number of terms in a rule, the use of any or all logical functions as sentence connective operators, a permanent or volatile rule memory with on-chip or external rule storage.

Further, the rule base can have various configurations and include address pointers rather than data values to optimize rule memory storage capacity and flexibility.

Finally, those skilled in the art of fuzzy logic will appreciate that techniques for the determination of an optimum output, also known as "defuzzification", include but are not limited to defuzzification by the Mean of Maximum method, the Maximum method, the Center of Area or Center of Gravity methods, or equivalent methods thereof.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for converting a digital data signal into a fuzzy logic value, comprising the steps of:

establishing a fuzzy set to have a width and a center identifying maximum and minimum membership values for said fuzzy set;

supplying said digital data signal and said center to a subtractor circuit;

outputting from said subtractor circuit a distance value representing a distance of said digital data signal from said center of said fuzzy set;

comparing said distance value with said width; and linearly complementing said distance value in accordance with said comparing step to obtain the fuzzy logic value.

2. A method as recited in claim 1, further comprising the step of storing the fuzzy logic value in a tangible medium.

3. A method as recited in claim 2, wherein said comparing step comprises the steps of:

supplying a comparison signal to a control logic circuit, said comparison signal indicating whether said distance value represents a value greater than said width;

supplying a polarity signal corresponding to said fuzzy set to said control logic circuit; and outputting from said control logic circuit a control signal in response to said comparison signal and said polarity signal, said control signal controlling said linearly complementing step to output one of the minimum and maximum membership values as said fuzzy logic value, in accordance with said polarity signal, when said distance value is greater than said width.

4. A method as recited in claim 3, wherein said linearly complementing step comprises the steps of:

supplying said control signal to an alpha cut calculator circuit, said alpha cut calculator circuit setting said fuzzy logic value to one of said minimum and maximum membership values in response to said control signal; and supplying said distance value to said alpha cut calculator circuit, said alpha cut calculator circuit executing said linearly complementing step of said distance value in accordance with a maximum width of said fuzzy set and outputting said fuzzy logic value as the linearly complemented distance value when said control signal indicates said distance value is not greater than said width.

5. A method as recited in claim 2, wherein said tangible medium storing said fuzzy logic value is a register.

6. A method as recited in claim 5, wherein said center and said width are stored in a memory.

7. A method as recited in claim 6, wherein said register storing said fuzzy logic value is a minimum register storing a fuzzy logic value as a minimum rule term, the method further comprising the steps of:

comparing the fuzzy logic value with a plurality of rule terms to determine the minimum rule term; and storing the minimum rule term in the minimum register.

8. A method as in claim 6, wherein said digital data signal represents a physical state within a predetermined physical range.

9. A method as recited in claim 1, wherein said comparing step comprises the steps of:

supplying to a control logic circuit a comparison signal indicating whether said distance value is greater than said width;

supplying a polarity signal corresponding to said fuzzy set to said control logic circuit; and outputting from said control logic circuit a control signal in response to said comparison signal and said polarity signal, said linearly complementing step comprising the step of outputting one of said minimum and maximum membership values as said fuzzy logic value, in accordance with said control signal, when said distance value is greater than said width.

10. A method as recited in claim 1, wherein said linearly complementing step is performed in accordance with a bit-length of said width.

11. A method as recited in claim 1, further comprising the steps of:

latching in a latch circuit a control signal from a fuzzy logic microcontroller that processes the fuzzy logic value;

supplying the latched control signal and said digital data signal to a multiplexer circuit; and selectively supplying one of said control signal and said digital data signal from said multiplexer circuit to said subtractor circuit.

12. A method as recited in claim 1, further comprising the steps of:

comparing the fuzzy logic value with a plurality of fuzzy logic values, generated in response to said digital data signal and corresponding selected rule terms, to determine a minimum rule term; and storing the minimum rule term in a minimum register.

13. A method as recited in claim 12, further comprising the step of storing a set of fuzzy logic rules in a rule memory, each of said fuzzy logic rules having a plurality of said rule terms, said establishing step comprising the step of selecting at least one of said rules from said rule memory.

14. A method for modifying a digital data input in a digital data stream into a fuzzy logic number, comprising the steps of:

defining a fuzzy set as a membership function having a width, a center location, and a membership function type, said center location indicating one of a maximum membership value and a minimum membership value in accordance with said membership function type, said width having a digital bit length;

generating a difference value representing a difference between said digital data input and said center location;

determining whether said digital data input is within the membership function in accordance with said difference value, said width, and said membership function type;

outputting said minimum membership value as the fuzzy logic number if said determining step determines that said digital input is not within the membership function; and digitally complementing said difference value in accordance with the width digital bit length and outputting the digitally complemented difference value as said fuzzy logic number.

15. A method as recited in claim 14, further comprising the step of storing said width and said center location in a tangible medium.

16. A method as recited in claim 15, wherein said tangible medium is a memory circuit.

17. A method as recited in claim 16, further comprising the step of storing the fuzzy logic number in a second tangible medium.

18. A method as in claim 16 wherein said digital data input represents a physical state within a predetermined physical range.

19. A method as recited in claim 14, further comprising the step of storing the fuzzy logic number in a tangible medium.

20. A method as recited in claim 19, further comprising the step of selecting said digital data input from the digital data stream in response to an input select signal.

21. A method as recited in claim 20, wherein the difference value generating step comprises the steps of:

supplying said center location and said digital data input to a subtractor circuit; and outputting from said subtractor circuit the difference value.

22. A method as recited in claim 21, wherein the determining step comprises the steps of:
supplying the difference value and the width to a comparator and outputting a comparison result in response thereto;
supplying the comparison result to a control logic circuit;
supplying said membership function type identifying said membership function as one of an inclusive function and an exclusive function to said control logic circuit.

23. A method as recited in claim 22, wherein said digitally complementing step comprises the steps of:
supplying the difference value to an alpha cut calculator circuit;
outputting a membership result signal representing the determination whether the digital data input is within the membership function from the control logic circuit to said alpha cut calculator circuit; and
outputting said digitally complemented difference value in response to said membership result signal.

24. A method as recited in claim 14, further comprising the step of storing a set of fuzzy logic rules in a tangible medium, each of said fuzzy logic rules having a plurality of rule terms each defining one of a plurality of said fuzzy sets, said defining step comprising the step of selecting at least one of said rules from said rule memory and implementing the rule terms corresponding to the selected at least one of said rules.

25. An apparatus converting a digital input signal to a fuzzy value, comprising:
a subtractor subtracting a value of the digital input signal with a center of a membership function and outputting a difference value;
a comparator comparing the difference value with a width of said membership function and outputting a comparison result representing whether the difference value is greater than the membership function width; and
a calculator digitally complementing said difference value in accordance with a bit length of said width and said comparison result to generate said fuzzy value.

26. An apparatus as recited in claim 25, wherein said calculator generates said fuzzy value further in accordance with a type signal identifying a type of said membership function.

27. An apparatus as recited in claim 26, wherein said calculator sets said fuzzy value to zero if said type signal identifies said membership function as an inclusive membership function and said comparison result indicates said difference value is greater than said membership function width.

28. An apparatus as recited in claim 26, wherein said calculator sets said fuzzy value to zero if said type signal identifies said membership function as an exclusive membership function and said comparison result indicates said difference value is less than said membership function width.

29. An apparatus as recited in claim 25, further comprising a tangible medium storing a plurality of rules each having rule terms, wherein said membership function corresponds to a selected one of said rule terms.

30. An apparatus as recited in claim 29, further comprising an interface supplying said center and width of said membership function from said tangible medium to said subtractor and said comparator, respectively.

31. A tangible medium having method steps embodied therein, the steps comprising:

accessing at least one of a plurality of rules stored on the tangible medium, each of said rules having at least one rule term identifying a membership function having a width and a center;
determining a difference between said center and a digital input data value;
comparing said difference with the width to determine if the digital input data value is within the membership function;
setting the digital input value to have a fuzzy logic value of zero if said comparing step determines the digital input data value is not within the membership function; and
digitally complementing the difference in accordance with a bit length of said width to obtain said fuzzy logic value when said digital input data value is within the membership function.

32. A tangible medium as recited in claim 31, wherein said tangible medium is an integrated circuit.

33. A tangible medium as recited in claim 32, wherein said digital input data value is stored on said tangible medium.

34. A tangible medium as recited in claim 33, wherein said fuzzy logic value is stored on said tangible medium.

35. A tangible medium as recited in claim 31, wherein said digital input data value is stored on said tangible medium.

36. A tangible medium as recited in claim 35, wherein said fuzzy logic value is stored on said tangible medium.

37. An apparatus executing a method comprising the steps of:
accessing at least one of a plurality of rules, each of said rules having at least one rule term identifying a membership function having a width and a center;
determining a difference between said center and a digital input data value;
comparing said difference with the width to determine if the digital input data value is within the membership function;
setting the digital input value to have a fuzzy logic value of zero if said comparing step determines the digital input data value is not within the membership function; and
digitally complementing the difference in accordance with a bit length of said width to obtain said fuzzy logic value when said digital input data value is within the membership function.

38. An apparatus as recited in claim 37, comprising a rule memory storing the accessed rules.

39. An apparatus as in claim 38, further comprising a subtractor circuit executing said determining step to obtain said difference.

40. An apparatus as in claim 38, further comprising a control logic circuit executing said comparing step in accordance with a polarity value accessed from said one rule term.

41. A method for generating a similarity signal based on an input signal for use with a fuzzy logic controller, said method comprising the steps of:
inputting said input signal to a subtractor circuit, said subtractor circuit generating a distance signal representing a distance of said input signal from a center location of a fuzzy set, said center location indicating a maximum membership value;
comparing said distance signal with a width of said fuzzy set, said width indicating minimum membership values for said fuzzy set;
generating a similarity signal based on said comparison and by linearly complementing said distance signal with respect to said width of said fuzzy set, wherein, said similarity signal is a maximum if said distance signal represents a minimum distance of said input signal from said center location, and said similarity signal is a minimum if said distance signal represents a maximum distance of said input signal from said center location.

42. A method as in claim 41, wherein said input signal is a signal indicating a detected condition, the method further comprising the step of supplying said similarity signal to said fuzzy logic controller, said fuzzy logic controller controlling said device in response to said supplied similarity signal.

43. A method as in claim 41, wherein said comparing step comprises the steps of:

supplying a comparison signal to a control logic circuit, said comparison signal indicating whether said distance signal represents a value greater than said width stored in said memory;

supplying a polarity signal corresponding to said fuzzy set to said control logic circuit; and outputting from said control logic circuit said control signal in response to said comparison signal and said polarity signal, said control signal controlling said similarity outputting step to output one of said minimum and maximum values, in accordance with said polarity signal, when said distance signal is greater than said width stored in said memory.

44. A method as in claim 43, wherein said similarity signal outputting step comprises the steps of:

supplying said control signal to an alpha cut calculator circuit, said alpha cut calculator circuit setting said similarity signal to one of said minimum and maximum values in response to said control signal;

supplying said distance signal to said alpha cut calculator circuit, said alpha cut calculator circuit executing said linearly complementing step of said distance signal in accordance with a maximum width of said fuzzy set, said alpha cut calculator circuit outputting said linearly complemented distance signal when said control signal indicates said distance signal is not greater than said width stored in said memory.

45. A method as in claim 41, wherein said comparing step comprises the steps of:

supplying a comparison signal to a control logic circuit, said comparison signal indicating whether said distance signal represents a value greater than said width stored in said memory;

supplying a polarity signal corresponding to said fuzzy set to said control logic circuit; and outputting from said control logic circuit said control signal in response to said comparison signal and said polarity signal, said control signal controlling said similarity outputting step to output one of said minimum and maximum values, in accordance with said polarity signal, when said distance signal is greater than said width stored in said memory.

46. A method as in claim 45, wherein said similarity signal outputting step comprises the steps of:

supplying said control signal to an alpha cut calculator circuit that sets said similarity signal to one of said minimum and maximum values in response to said control signal;

supplying said distance signal to said alpha cut calculator circuit, said alpha cut calculator circuit executing said linearly complementing step of said distance signal in accordance with a maximum width of said fuzzy set, said alpha cut calculator outputting said linearly complemented distance signal when said control signal indicates said distance signal is not greater than said width stored in said memory.

47. A method as in claim 41, further comprising the steps of:

receiving and latching in a latch circuit a control signal from said fuzzy logic controller, said fuzzy logic controller outputting said control signal in response to said output similarity signal, said control signal controlling a device coupled to said latched control signal and said input signal to a multiplexer circuit; and selectively supplying one of said control signal and said input signal from said multiplexer circuit to said subtractor circuit.

48. A method for generating a similarity signal based on an input signal produced by a physical sensor for use with a fuzzy logic controller, said method comprising the steps of:

receiving said input signal from a sensor measuring a physical state within a predetermined physical range, said receiving step including the step of latching said input signal to a latch circuit;

inputting said input signal from said latch to a subtractor circuit, said subtractor circuit generating a distance signal representing a distance of said input signal from a center location of a fuzzy set, said center location and indicating a maximum membership value corresponding to said physical range;

comparing said distance signal with a width of said fuzzy set, said width and indicating minimum membership values for said fuzzy set;

generating a similarity signal based on said comparison, said similarity signal representing a membership value of said input signal with respect to said fuzzy set and said similarity signal being generated based on a linear complement of said distance signal with respect to said width of said fuzzy set, wherein, said similarity signal is a maximum if said distance signal represents a minimum distance of said input signal from said center location, and said similarity signal is a minimum if said distance signal represents a maximum distance of said input signal from said center location.

49. A method as in claim 48, further comprising the step of supplying said similarity signal to said fuzzy logic microcontroller, said fuzzy logic microcontroller controlling a device in response to said supplied similarity signal.

50. A method for generating a similarity signal based on a crisp input signal from a sensor measuring a physical state within a predetermined physical range comprising the steps of:

receiving said crisp input signal from said sensor, said receiving step including the step of latching said crisp input signal to a latch circuit;

inputting said latched crisp input signal to a subtractor circuit, said subtractor circuit generating a distance signal representing a distance of said latched crisp input signal from a center location of a fuzzy set, said center location corresponding to said physical range and indicating a maximum membership value;

generating a similarity signal based on said distance signal, a width of said fuzzy set and a polarity signal representing a polarity of said fuzzy set, said width of said fuzzy signal indicating minimum membership values, and said similarity signal representing a membership value of said latched crisp input signal with respect to said fuzzy set and being generated based on a linear complement of said distance signal with respect to said width of said fuzzy set, wherein, said similarity signal represents a maximum value if said distance signal represents a minimum distance of said crisp input signal from said center location and said polarity signal is true, said similarity signal represents a minimum value if said distance signal and said predetermined width indicate said crisp input signal exceeds said width of said membership function and said polarity signal is true, said similarity signal represents a maximum value if said distance signal and said predetermined width indicate said crisp input signal exceeds said width of said membership function and sail polarity signal is inverse, and said similarity signal represents a minimum value if said distance signal represents a minimum distance of said crisp input signal from said center location and said polarity signal is inverse.

51. A method as in claim 50, further comprising the steps of:
receiving and latching in a second latch circuit a control signal from said fuzzy logic microcontroller, said fuzzy logic microcontroller outputting said control signal in response to said output similarity signal;
supplying said latched control signal and said latched crisp input signal to a multiplexer circuit; and
selectively supplying one of said control signal and said crisp input signal from said multiplexer circuit to said subtractor circuit.

52. A method for controlling at least one device in response to at least one sensor signal indicating a physical state of said device within a predetermined physical range, said method comprising the steps of:
storing in a first memory circuit width and center location characteristics of a plurality of fuzzy sets corresponding to said at least one predetermined physical range, each of said fuzzy sets having a membership function with a width and a center location;
storing in a second memory circuit a plurality of rules corresponding to at least one control output to said controlled device, each of said rules having an action value and rule terms corresponding to at least one of said fuzzy sets;
receiving and latching in a latch circuit said at least one sensor signal;
supplying said latched sensor signal and said stored center location to a subtractor circuit, said subtractor circuit generating a distance signal for each of said fuzzy sets, said distance signal representing a distance of said crisp input signal from said center location of said corresponding fuzzy set;
generating a fuzzified input signal for each of said fuzzy sets, said generation of fuzzified input signals comprising the steps of:
comparing said distance signal with said width said fuzzy set stored in said memory of said corresponding fuzzy set,
setting said fuzzified input signal to a minimum value when said distance signal is greater than said stored width of said corresponding fuzzy set,
linearly complementing said distance signal in accordance with said width of said corresponding fuzzy set, and
outputting said linearly complemented distance signal as said fuzzified input signal when said distance signal is not greater than said stored width of said corresponding fuzzy set;
determining a minimum rule term for each of said rules in response to said fuzzified input signals of each of said fuzzy sets;
determining a maximum rule term among said minimum rule terms of said corresponding rules;
outputting said control output to said device by executing an optimal rule corresponding to said maximum rule term in accordance with said corresponding action value.

53. A method as in claim 52, further comprising the steps of:
supplying said control signal and said latched sensor signal to a multiplexer circuit; and
selectively supplying one of said control signal and said latched sensor signal from said multiplexer circuit to said subtractor circuit.

54. A method as in claim 52, wherein said method controls said device in response to a plurality of said sensor signals, the method further comprising the steps of:
receiving said plurality of sensor signals as time division multiplexed input signals into a time division demultiplexer circuit; and
repeating said receiving and latching step for each of said plurality of sensor signals received by said time division demultiplexer circuit, said time division demultiplexer sequentially outputting each of said plurality of sensor signals to said latch circuit.

55. A method as in claim 54, further comprising the steps of:
repeating said control output step for a predetermined number of times;
supplying said control outputs from said repeating control output step to a time division multiplexer circuit; and
outputting from said time division multiplexer circuit time division multiplexed control output signals and supplying said time division multiplexed control output signals to said device.

56. A method as in claim 55, further comprising the steps of:
inputting said time division multiplexed input signals and said time division multiplexed control output signals to a demultiplexer circuit;
selectively outputting from said demultiplexer circuit to said time division demultiplexer circuit, in response to a select signal, one of said time division multiplexed input signals and said time division multiplexed control output signals.

57. A method as recited in claim 52, further comprising the steps of:
repeating said control output step for a predetermined number of times;
supplying said control outputs from said repeating control output step to a time division multiplexer circuit;
outputting from said time division multiplexer circuit time division multiplexed control output signals and supplying said time division multiplexed control output signals to said device.

58. A method a in claim 52, wherein said method controls said device in response to a plurality of said sensor signals, the method further comprising the steps of:
receiving said plurality of sensor signals as time division multiplexed input signals into a time division demultiplexer circuit; and repeating said receiving and latching step for each of said plurality of sensor signals received by said time division demultiplexer circuit, said time division demultiplexer sequentially outputting each of said plurality of sensor signals to said latch circuit.

59. A method as in claim 58, further comprising the steps of:

repeating said control output step for a predetermined number of times;

supplying said control outputs from said repeating control output step to a time division multiplexer circuit;

outputting from said time division multiplexer circuit time division multiplexed control output signals and supplying said time division multiplexed control output signals to said device.

* * * * *